(12) United States Patent
Zhu et al.

(10) Patent No.: US 11,706,704 B2
(45) Date of Patent: Jul. 18, 2023

(54) MANAGING USER PLANE ENTITIES AT DIFFERENT LOCATIONS IN A PDU SESSION

(71) Applicant: HUAWEI TECHNOLOGIES CO., LTD., Shenzhen (CN)

(72) Inventors: Fenqin Zhu, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 329 days.

(21) Appl. No.: 16/664,481

(22) Filed: Oct. 25, 2019

(65) Prior Publication Data

US 2020/0077329 A1 Mar. 5, 2020

Related U.S. Application Data

(63) Continuation of application No. PCT/CN2018/085099, filed on Apr. 28, 2018.

(30) Foreign Application Priority Data

May 5, 2017 (CN) .......................... 201710314201.2
Feb. 13, 2018 (CN) .......................... 201810150678.6

(51) Int. Cl.
*H04W 48/18* (2009.01)
*H04W 76/10* (2018.01)
(Continued)

(52) U.S. Cl.
CPC ............. *H04W 48/18* (2013.01); *H04L 45/72* (2013.01); *H04W 64/00* (2013.01); *H04W 72/51* (2023.01); *H04W 76/10* (2018.02); *H04W 80/02* (2013.01)

(58) Field of Classification Search
CPC ..... H04W 48/18; H04W 76/10; H04W 64/00; H04W 72/048; H04W 80/02; H04W 8/22; H04L 45/72; H04L 12/5691
See application file for complete search history.

(56) References Cited

U.S. PATENT DOCUMENTS

2014/0169269 A1 6/2014 Salot et al.
2018/0227743 A1* 8/2018 Faccin ................ H04L 65/1069
(Continued)

FOREIGN PATENT DOCUMENTS

CN          101009907 A      8/2007
CN          101286915 A     10/2008
(Continued)

OTHER PUBLICATIONS

Faccin et al. (US 2018/0227743 A1, U.S. Appl. No. 62/455,418, filed Feb. 6, 2017) (Year: 2017).*

(Continued)

*Primary Examiner* — Ian N Moore
*Assistant Examiner* — Brian T Le
(74) *Attorney, Agent, or Firm* — Huawei Technologies Co., Ltd.

(57) ABSTRACT

This application discloses a session management method, a network device, and a communications system. According to embodiments of the present invention, an intermediate session management entity is selected based on UE location information and PDU session requirement information. In this way, an intermediate session management entity near UE can provide a service for a PDU session, and a delay of data transmission is reduced. In addition, the intermediate session management entity selects a user plane entity based on the UE location information and the PDU requirement information, and the intermediate session management entity is responsible for managing user plane entities within (Continued)

a specified area, and does not need to manage user plane entities in the entire PDU session, thereby reducing management complexity.

8 Claims, 11 Drawing Sheets

(51) Int. Cl.
*H04L 45/00* (2022.01)
*H04W 64/00* (2009.01)
*H04W 72/51* (2023.01)
*H04W 80/02* (2009.01)

(56) References Cited

U.S. PATENT DOCUMENTS

| | | | |
|---|---|---|---|
| 2019/0150219 A1* | 5/2019 | Wang | H04W 76/30 370/329 |
| 2020/0015066 A1* | 1/2020 | Zhu | H04W 8/10 |
| 2020/0053636 A1* | 2/2020 | Mas Rosique | H04W 48/18 |

FOREIGN PATENT DOCUMENTS

| | | |
|---|---|---|
| CN | 102196405 A | 9/2011 |
| WO | 2015057034 A1 | 4/2015 |
| WO | 2019157942 A1 | 8/2019 |
| WO | 2019193129 A1 | 10/2019 |

OTHER PUBLICATIONS

3GPP TS 23.502 V0.3.0 (Mar. 2017),3rd Generation Partnership Project;Technical Specification Group Services and System Aspects;Procedures for the 5G System;Stage 2 (Release 15),total 115 pages.

3GPP TS 23.501 V0.4.0 (Apr. 2017),3rd Generation Partnership Project;Technical Specification Group Services and System Aspects;System Architecture for the 5G System;Stage 2 (Release 15),total 124 pages.

S2-171750 Ericsson,"23.501: UPF and SMF Service Areas",SA WG2 Meeting #120,Mar. 27-31, 2017, Busan, Korea,total 8 pages.

S2-174193 Ericsson,"SMF Service Areas",SA WG2 Meeting #122,Jun. 26-30, 2017, San Jose Del Cabo, Mexico,total 17 pages.

S2-174325 Huawei et al.,"Intermediate SMF/UPF selection and the architecture",SA WG2 Meeting #122,Jun. 26-30, 2017, San Jose Del Cabo, Mexico,total 11 pages.

S2-171870 Huawei et al., "TS 23.501: Relation between the SMF and UPF",SA WG2 Meeting #120,Mar. 27-31, 2017, Busen, Korea,total 8 pages.

S2-182915 MediaTek Inc. et al.,"Allowed NSSAI and Access Type",3GPP TSG-SA2 Meeting #126,Montreal, Canada, Feb. 26-Mar. 2, 2018,total 4 pages.

China Mobile et al.,"Analysis of the forking model for IMS CAT", 3GPP TSG SA WG2 Meeting #66 TD S2-084903, Montreal, Canada, Jun. 23-27, 2008, total 7 pages.

* cited by examiner

MANAGING USER PLANE ENTITIES AT DIFFERENT LOCATIONS IN A PDU SESSION

CROSS-REFERENCE TO RELATED APPLICATIONS

This application is a continuation of International Application No. PCT/CN2018/085099, filed on Apr. 28, 2018, which claims priority to Chinese Application No. 201710314201.2, filed on May 5, 2017 and Chinese Application No. 201810150678.6, filed on Feb. 13, 2018, all of which are hereby incorporated by reference in their entireties.

TECHNICAL FIELD

Aspects of the present invention relate to the communications field, and in particular, to a session management method, a network device, and a communications system.

BACKGROUND in a 5G new radio network architecture, a session management entity (SMF for short) is responsible for session management including establishment, modification, release, and the like of a PDU (Protocol Data Unit, PDU for short) session; and a user plane entity (UPF for short) is responsible for forwarding user data. In a current network architecture, a plurality of user plane entities may exist on a user plane path of a PDU session. Two different user plane entities in the plurality of user plane entities may be located far apart. For example, one user plane entity may be located near an access point of UE while the other user plane entity may be located near a data network. How to manage a plurality of user plane entities at different locations in a PDU session is currently under discussion.

SUMMARY

A technical problem to be resolved by embodiments of the present invention is to provide a session management method, a network device, and a communications system, to manage user plane entities at different locations.

According to a first aspect, this application provides a session management method, including: selecting, by a network device, a first intermediate session management entity based on UE (User Equipment, UE for short) location information and PDU (Protocol Data Unit, PDU for short) session requirement information; and sending, by the network device, the UE location information and the PDU session requirement information to the first intermediate session management entity, where the PDU session requirement information is used to select a user plane entity. The first intermediate session management entity is responsible for managing only network elements (for example, an access network device or a user plane entity) within a specified area. The PDU session requirement information indicates a PDU session related parameter determined by a core network. The network device is a device in the core network, and the network device may be an access management entity or a session management entity. The access management entity is configured to perform access management on UE, and the session management entity is configured to manage a session established by the UE.

Through implementation of the foregoing embodiment, the network device selects the intermediate session management entity based on the UE location information and the PDU session requirement information. In this way, an intermediate session management entity near the UE can provide a service for the PDU session, and a delay of data transmission is reduced. In addition, the intermediate session management entity selects the user plane entity based on the UE location information and the PDU requirement information, and the intermediate session management entity manages only user plane entities within a specified area, and does not need to manage user plane entities in the entire PDU session, thereby reducing management complexity.

In a possible implementation of the first aspect, the PDU session requirement information includes a PDU session type and/or an SSC (Session and Service Continuity. SSC for short) mode.

In a possible implementation of the first aspect, the selecting, by a network device, a first intermediate session management entity for a PDU session based on UE location information and PDU session requirement information includes: selecting, by the network device, an intermediate session management entity as the first intermediate session management entity, where the intermediate session management entity meets the PDU session requirement information and manages an area covering a serving base station indicated by the UE location information. The PDU session requirement information includes a PDU session type and/or SSC. The UE location information may be an identifier of a serving base station of the UE, an identifier of a serving cell of the UE, or an identifier of a tracking area of the UE. The network device may determine, based on the UE location information, whether a serving base station indicated by the UE location information can be connected to the first intermediate session management entity. Each intermediate session management entity has a specific management area, and a size of the management area is not limited in this application. For example, the management area of the intermediate session management entity is a province, a city, or a data center.

In a possible implementation of the first aspect, the PDU session requirement information includes a PDU session type and/or SSC. If the network device determines that an intermediate session management entity that meets the PDU session requirement information and that manages an area covering a serving base station indicated by the UE location information does not exist, the network device selects a second intermediate session management entity that meets the PDU session requirement information, and selects a third intermediate session management entity that manages an area covering the serving base station indicated by the UE location information. Both the second intermediate session management entity and the third intermediate session management entity provide a service for the PDU session. In this way, a same PDU session can be served by a plurality of intermediate session management entities, and each intermediate session management entity is responsible for managing only network elements within a specified area, thereby reducing management load and complexity of the intermediate session management entity.

In a possible implementation of the first aspect, the PDU session requirement information includes a local DNN and a data transmission mode. The local DNN is a name of a local DN (Data Network, DN for short). The data transmission mode is a transmission mode of a data packet on a user plane, and a data transmission mode is a multihoming (multihoming) mode or a ULCL (Uplink Classifier) mode.

In a possible implementation of the first aspect, the selecting, by a network device, a first intermediate session management entity for a PDU session based on UE location information and PDU session requirement information includes: selecting, by the network device, an intermediate session management entity as the first intermediate session management entity, where the intermediate session management entity manages an area covering a serving base station indicated by the UE location information and a local DN indicated by the local DNN and supports the data transmission mode included in the PDU session requirement information.

In a possible implementation of the first aspect, when the network device determines that an intermediate session management entity that manages an area covering a serving base station indicated by the UE location information and a local DN indicated by the local DNN included in the PDU session requirement information and that supports the data transmission mode included in the PDU session requirement information does not exist, the network device selects a second intermediate session management entity that manages an area covering the serving base station indicated by the UE location information, and selects a third intermediate session management entity that manages an area covering the local DN indicated by the local DNN included in the PDU session requirement information and that supports the data transmission mode included in the PDU session requirement information. The network device may be an access management entity or a session management entity, and both the second intermediate session management entity and the third intermediate session management entity provide a service for the PDU session.

In a possible implementation of the first aspect, the data transmission mode is a multihoming mode, and the network device sends an uplink offloading policy and an uplink routing policy to the first intermediate session management entity, where the uplink offloading policy is used to control a branch point BP to which the UE is anchored to perform offloading based on a source address of a data packet sent by the UE, and the uplink routing policy is used to control the UE to use an IP address anchored to an anchor user plane entity or a local IP address anchored to a local anchor user plane entity, as the source address of the data packet. Alternatively, the network device sends, to the first intermediate session management entity, an IP address anchored to an anchor user plane entity and an uplink routing policy corresponding to the IP address anchored to the anchor user plane entity. The IP address anchored to the anchor user plane entity is configured to enable the first intermediate session management entity to generate an uplink offloading policy. The uplink routing policy corresponding to the IP address anchored to the anchor user plane entity is configured to enable the first intermediate session management entity to generate an uplink routing policy. The uplink offloading policy is used to control the BP to perform offloading based on the source address of the data packet sent by the UE. The uplink routing policy is used to instruct the UE to use the IP address anchored to the anchor user plane entity or a local IP address anchored to a local anchor user plane entity, as a source address for sending data.

In a possible implementation of the first aspect, the data transmission mode is a ULCL mode, and the network device sends an uplink forwarding policy to the first intermediate session management entity, where the uplink forwarding policy is used to control a ULCL to which the UE is anchored to perform forwarding based on a quintuple and/or an application identifier of a data packet sent by the UE.

In a possible implementation of the first aspect, in a handover process of the UE, the UE is handed over to a target base station from a current serving base station. Before the handover occurs, the UE has established a PDU session, and the network device stores PDU session requirement information of the PDU session. Based on a path switch message from the target base station, the network device can learn that the UE is to be handed over to the target base station from the current serving base station. The network device determines that the target base station is not within a management area of the current first intermediate session management entity. Therefore, the network device selects a target intermediate session management entity that meets the PDU session requirement information and that manages an area covering the target base station to which the UE is to be handed over. When an intermediate session management entity that meets the PDU session requirement information and that manages an area covering the target base station does not exist, the network device selects a second intermediate session management entity that manages an area covering the target base station, selects a third intermediate session management entity that meets the PDU session requirement information, and uses the second intermediate session management entity and the third intermediate session management entity as target intermediate session management entities.

In a possible implementation of the first aspect, the network device is a session management entity, and before the selecting, by the session management entity, a first intermediate session management entity for a PDU session based on UE location information and PDU session requirement information, the method further includes: determining, by the session management entity, the PDU session requirement information, where the session management entity may determine the PDU session requirement information based on PDU session subscription information; or determining, by the session management entity, the PDU session requirement information based on PDU session subscription information and either or both of PDU session policy information and expected PDU session information. The session management entity selects an anchor user plane entity within a management area of the session management entity based on the PDU session requirement information. For example, the management area of the session management entity may be a province, a city, a data center, or another area. This is not limited in this application. A specific management area may be configured by an operator. The session management entity determines, based on the UE location information, a serving base station indicated by the UE location information. When determining that the serving base station indicated by the UE location information is not connected to the selected anchor user plane entity, the session management entity selects a first intermediate session management entity based on the UE location information and the PDU session requirement information. It should be noted that the PDU session policy information indicates a related policy of the PDU session, for example, QoS (Quality of Service, QoS for short). The expected PDU session information indicates a session related parameter requested by the UE. For example, the expected PDU session information includes one or more of a local DNN, a PDU session type, and an SSC mode.

In a possible implementation of the first aspect, the network device is a session management entity, and before the selecting, by the session management entity, a first intermediate session management entity for a PDU session based on UE location information and PDU session requirement information, the method further includes: determining, by the session management entity, the PDU session requirement information based on PDU session subscription information; or determining, by the session management entity, the PDU session requirement information based on PDU session subscription information and either or both of expected PDU session information and PDU session policy information. The PDU session policy information may come from a policy control entity in a core network. The expected PDU session information indicates a PDU session related parameter requested by the UE, and the expected PDU session information includes one or more of a PDU session type, an SSC mode, and a local DNN. The session management entity determines that the local DN indicated by the local DNN included in the PDU session requirement information is not located within the management area of the session management entity.

In a possible implementation of the first aspect, the network device is an access management entity, and before the selecting, by the network device, a first intermediate session management entity for a PDU session based on UE location information and PDU session requirement information, the method further includes: selecting, by the access management entity, a session management entity. The access management entity may select a session management entity based on a local DNN, network slice information, and UE subscription information from the UE. When the access management entity determines that the serving base station indicated by the UE location information is not located within the management area of the session management entity, the access management entity selects a fourth intermediate session management entity based the UE location information and on one or more of the local DNNs, the network slice information, and the UE subscription information from the UE. The access management entity receives the PDU session requirement information and a reselection indication message from the session management entity, where the reselection indication message is used to instruct the access management entity to reselect a first intermediate session management entity that is different from the fourth intermediate session management entity.

In a possible implementation of the first aspect, the network device is an access management entity, and before the selecting, by the network device, a first intermediate session management entity for a PDU session based on UE location information and PDU session requirement information, the method further includes: selecting, by the access management entity, a session management entity. The access management entity may select the session management entity based on either or both of a local DNN and network slice information that are carried in a PDU session establishment request from the UE. When the session management entity determines that the serving base station indicated by the UE location information is not located within the management area of the session management entity, the access management entity selects a fourth intermediate session management entity, receives the PDU session requirement information from the session management entity, and determines that the fourth intermediate session management entity does not meet the PDU session requirement information.

In a possible implementation of the first aspect, the network device is an access management entity, and before the selecting, by the network device, a first intermediate session management entity for a PDU session based on UE location information and PDU session requirement information, the method further includes: receiving, by the access management entity, new PDU session requirement information and a reselection indication message from the session management entity when a PDU session requirement changes, where the reselection indication message is used to instruct the access management entity to reselect an intermediate session management entity.

In a possible implementation of the first aspect, the network device is an access management entity, and the first intermediate session management entity currently provides a service for a PDU session. When a PDU session requirement changes, the access management entity receives new PDU session requirement information from the session management entity. The access management entity determines that the first intermediate session management entity does not meet the new PDU session requirement information, and selects a target intermediate session management entity based on the UE location information and the new PDU session requirement information.

In a possible implementation of the first aspect, the network device is a session management entity, and the session management entity determines the PDU session requirement information based on PDU session subscription information, or based on PDU session subscription information and either or both of PDU session policy information and expected PDU session information. When the session management entity determines that the fourth intermediate session management entity selected by the access management entity does not meet the PDU session requirement information, the session management entity selects a first intermediate session management entity for the PDU session based on the UE location information and the PDU session requirement information. The session management entity sends identifier information of the first intermediate session management entity to the access management entity, where the identifier information is used to uniquely represent an identity of the first intermediate session entity. For example, the identifier information of the first intermediate session management entity may be address information, location information, or an ID (Identity, identity information, ID for short).

According to a second aspect, this application provides a communications system. The communications system includes a network device and a first intermediate session management entity. The network device may be an access management entity or a session management entity, and the network device is configured to select a first intermediate session management entity for a PDU session based on UE location information and PDU session requirement information. The first intermediate session management entity is configured to: receive the PDU session requirement information from the network device, and select a user plane entity based on the UE location information and the PDU session requirement information. It should be noted that the session management entity and the first intermediate session management entity each have a specific management area, and the management area of the session management entity does not overlap that of the first intermediate session management entity. The first intermediate session management entity is responsible for managing network elements within the management area. For example, sizes of management areas of the user plane entity and the first intermediate session management entity may be determined by an operator as required. For example, the management area of the first intermediate session management entity is a province, a city, or a data center. This is not limited in this application.

Through implementation of the embodiment according to the second aspect, the network device selects the intermediate session management entity based on the UE location information and the PDU session requirement information.

In this way, an intermediate session management entity near UE can provide a service for the PDU session, and a delay of data transmission is reduced. In addition, the intermediate session management entity selects the user plane entity based on the UE location information and the PDU requirement information, and the intermediate session management entity manages only user plane entities within a specified area, and does not need to manage user plane entities in the entire PDU session, thereby reducing management complexity.

In a possible implementation of the second aspect, the first intermediate session management entity is further configured to: receive an uplink offloading policy and an uplink routing policy from the network device, configure the uplink offloading policy onto a BP, and configure the uplink routing policy onto UE, where the uplink offloading policy is used to control the BP to perform offloading based on a source address of a data packet sent by the UE, and the uplink routing policy is used to control the UE to use an IP address anchored to an anchor user plane entity or a local IP address anchored to a local anchor user plane entity, as the source address of the data packet; or the first intermediate session management entity is further configured to send, to the first intermediate session management entity, an IP address anchored to an anchor user plane entity and an uplink routing policy corresponding to the iP address anchored to the anchor user plane entity, where the IP address anchored to the anchor user plane entity is configured to enable the first intermediate session management entity to generate an uplink offloading policy, the uplink routing policy corresponding to the IP address anchored to the anchor user plane entity is configured to enable the first intermediate session management entity to generate an uplink routing policy, the uplink offloading policy is used to control a BP to perform offloading based on a source address of a data packet sent by UE, and the uplink routing policy is used to instruct the UE to use the IP address anchored to the anchor user plane entity or a local IP address anchored to a local anchor user plane entity, as a source address for sending data.

In a possible implementation of the second aspect, the data transmission mode is a ULCL mode, and the first intermediate session management entity is configured to select a user plane entity within the management area of the first intermediate session management entity based on the UE location information and the PDU session requirement information, which is specifically: selecting a local anchor user plane entity for the PDU session, and selecting a ULCL for the PDU session. It should be noted that the session management entity further selects an anchor user plane entity for the PDU session, where the anchor user plane entity is configured to connect to a DN. The ULCL corresponds to two transmission links: a transmission link between the ULCL and the anchor user plane entity, and a transmission link between the ULCL and the user plane entity. The ULCL performs offloading based on a quintuple and/or an application identifier of a data packet from the UE, where the quintuple includes a source IP address, a destination IP address, a source port number, a destination port number, and a protocol version, and the application identifier is identifier information of an application program that generates the data packet and that is on the UE. The ULCL performs offloading based on a preset uplink forwarding policy, and the uplink forwarding policy indicates a correspondence between a transmission link identifier and the quintuple and/or the application identifier.

In a possible implementation of the second aspect, the first intermediate session management entity is further configured to: receive an uplink forwarding policy sent from the network device, and configure the uplink forwarding policy onto the ULCL.

In a possible implementation of the second aspect, the PDU session requirement information further includes a PDU session type, and the PDU session type is an IP type. The first intermediate session management entity is further configured to send, to the session management entity, a local IP address of the UE and either or both of location information of a local anchor user plane entity and location information of a local ON, where the local IP address of the UE is an IP address that is allocated by the first intermediate session management entity and that is anchored onto the local anchor user plane entity.

According to a third aspect, this application provides an apparatus. The apparatus has a function of performing behavior of the network device in the foregoing method. The function may be implemented by hardware, or may be implemented by hardware executing corresponding software. The hardware or the software includes one or more units corresponding to the foregoing function.

In a possible implementation, the apparatus includes a selection unit and a transceiver unit, where the selection unit is configured to select a first intermediate session management entity for a protocol data unit PDU session based on user equipment UE location information and PDU session requirement information; and the transceiver unit is configured to send the UE location information and the PDU session requirement information to the first intermediate session management entity, where the UE location information and the PDU session requirement information are used to select a user plane entity.

In another possible implementation, the network device includes a transceiver, a memory, and a processor. The memory stores a set of program code, and the processor is configured to invoke the program code stored in the memory to perform the session management method according to any one of the first aspect to the possible implementations of the first aspect.

Based on a same inventive concept, for a principle for resolving a problem and beneficial effects of the apparatus, refer to the foregoing possible method implementations of a terminal device and brought beneficial effects. Therefore, for implementation of the apparatus, refer to the implementation of the method, and repeated parts are not described herein again.

According to a fourth aspect, this application provides a session management method, including:

selecting, by a network device, a first intermediate session management entity for a protocol data unit PDU session based on a local data network name DNN; and sending, by the network device, user equipment UE location information to the first intermediate session management entity, where the UE location information is used to select a user plane entity.

In a possible design, the selecting, by a network device, a first intermediate session management entity for a PDU session based on a local DNN includes:

selecting, by the network device based on the local DNN and the UE location information, a first intermediate session management entity that supports a local data network DN indicated by the local DNN and that manages an area covering a serving base station indicated by the UE location information.

In a possible design, the selecting, by a network device, a first intermediate session management entity for a PDU session based on a local DNN includes:

selecting, by the network device, an intermediate session management entity as the first intermediate session management entity, where the intermediate session management entity supports a local data network DN indicated by the local DNN.

In a possible design, the network device is a session management entity, and the method further includes:

determining, by the network device, the local DNN based on information from an application function.

In a possible design, the method further includes:

sending, by the network device, the UE location information to the first intermediate session management entity, where the UE location information is used to instruct the first intermediate session management entity to select a user plane entity that supports a UE location, and the user plane entity that supports the UE location is interfaced with an access network connected to UE.

In a possible design, the method further includes:

sending, by the network device, the local DNN to the first intermediate session management entity, where the local DNN is used to instruct the first intermediate session management entity to select a local anchor user plane entity.

In a possible design, the user plane entity selected by the first intermediate session management entity supports both the local DNN and the UE location information; or when the user plane entity that supports both the local DNN and the UE location information does not exist, the first intermediate session management entity selects a user plane entity as the local anchor user plane entity based on the local DNN, where the user plane entity supports the local DNN; and selects, based on the UE location information, a user plane entity that supports the UE location information, where the user plane entity is configured to interface with the access network connected to the UE, and the local anchor user plane entity is configured to interface with the local DN.

In a possible design, the network device sends a data transmission mode to the first intermediate session management entity, where the data transmission mode is used to instruct the first intermediate session management entity to determine an uplink offloading rule.

In a possible design, the network device sends an IP address of remote UE to the first intermediate session management entity if the data transmission mode is multi-homing multihoming, where the IP of the remote UE is used to instruct the first intermediate session management entity to determine the uplink offloading rule.

In a possible design, the network device sends application information to the first intermediate session management entity if the data transmission mode is an uplink classifier ULCL, where the application information is used to instruct the first intermediate session management entity to determine the uplink offloading rule, and the application information is at least one of an application identifier or a quintuple corresponding to an application.

In a possible design, the network device sends the uplink offloading rule or an uplink forwarding rule to the first intermediate session management entity, where the uplink offloading rule or the uplink forwarding rule is used to instruct the first intermediate session management entity to configure the user plane entity to offload uplink data.

In a possible design, the network device sends information about routing between a local anchor and the local data network DN identified by the local DNN to the first intermediate session management entity, where the information about routing is used to determine a forwarding path between the user plane entity and the local data network DN.

Another aspect of this application provides an apparatus. The apparatus includes a memory and a processor. The memory stores a set of program code, and the processor is configured to invoke the program code stored in the memory to perform the fourth aspect and the possible implementations of the fourth aspect.

According to a fifth aspect, this application provides an apparatus. The apparatus has a function of performing behavior of the network device according to the possible implementations of the fourth aspect. The function may be implemented by hardware, or may be implemented by hardware executing corresponding software. The hardware or the software includes one or more units corresponding to the foregoing function.

In a possible implementation, the apparatus includes a selection unit and a transceiver unit.

Another aspect of this application provides a computer-readable storage medium. The computer-readable storage medium stores an instruction. When the instruction is run on a computer, the computer is enabled to perform the method according to the foregoing aspects.

Another aspect of this application provides a computer program product including an instruction. When the instruction is run on a computer, the computer is enabled to perform the method according to the foregoing aspects.

BRIEF DESCRIPTION OF DRAWINGS

To describe the technical solutions in the embodiments of the present invention or in the background more clearly, the following briefly describes the accompanying drawings required for describing the embodiments of the present invention or the background.

FIG. 1b is a diagram of a next-generation network architecture based on FIG. 1a;

FIG. 2b is a diagram of a next-generation network architecture based on FIG. 2a;

DESCRIPTION OF EMBODIMENTS

The following describes the embodiments of the present invention with reference to the accompanying drawings in the embodiments of the present invention.

Figure 1A:
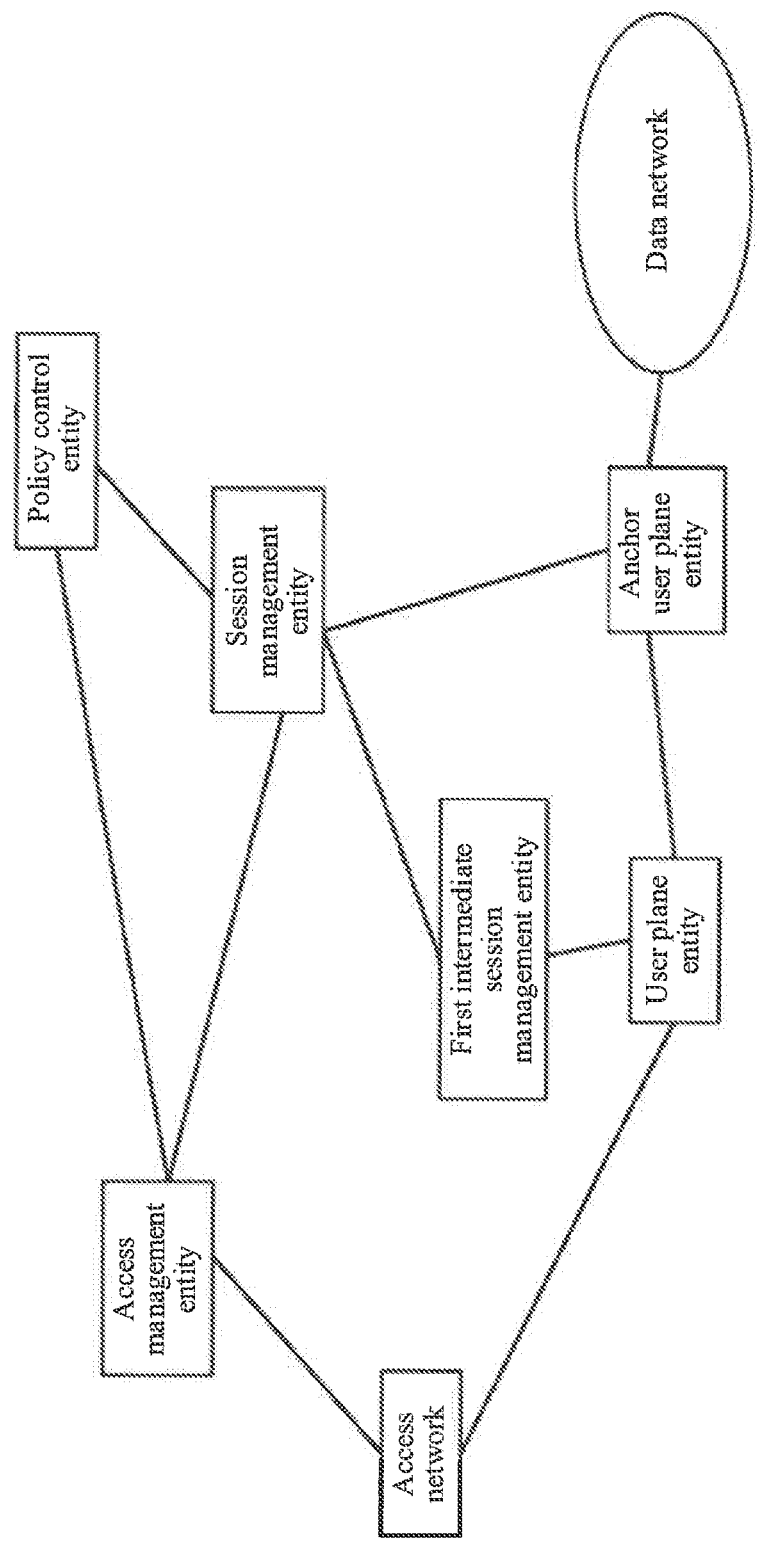
FIG. 1a is a diagram of a network architecture according to an embodiment of the present invention.

FIG. 1a is schematic architectural diagram of a communications system according to an embodiment of the present invention. The communications system may be a global system for mobile communications (GSM), a code division multiple access (CDMA) system, a wideband code division multiple access (WCDMA) system, a worldwide interoperability for microwave access (WiMAX) system, a long term evolution (LTE) system, a 5G communications system (for example, a new radio (new radio, NR) system or a communications system that integrates a plurality of communications technologies (for example, a communications system integrating an LTE technology and an NR technology), or a subsequent evolved communications system. The communications system in FIG. 1a includes an access network, an access management entity, a session management entity, and a first intermediate session management entity, and may further include a policy control entity. It should be noted that forms and quantities of the network elements in FIG. 1a are merely examples for description and do not constitute any limitation on the embodiments of the present invention.

The access management entity interworks with the policy control entity, the access network, and the session management entity; the session management entity interworks with the policy control entity, the first intermediate session management entity, and an anchor user plane entity; the access network interworks with the access management entity and a user plane entity; the first intermediate session management entity interworks with the session management entity and the user plane entity; the anchor user plane entity interworks with a data network; and the access management entity interworks with the session management entity.

The access management entity is mainly responsible for access and mobility management, including functions such as authentication, handover, and location update for a user. The session management entity is mainly responsible for session management, including functions such as establishment, modification, and release of a PDU session. The policy control function is mainly responsible for management of user measurement, including generation of mobility-related policies and PDU session-related policies. For example, the PDU session-related policies include a QoS (Quality of Service) policy and a charging policy. The user plane entity is mainly responsible for forwarding user data, and the user plane entity is classified into a common user plane entity and an anchor user plane entity. An anchor user plane function is a user plane function connected to the data network, where the data network is a destination to be accessed by a PDU session of a user. The first intermediate session management entity is mainly responsible for managing user plane entities within a management area, including load sharing between user plane entities, selection of a user plane entity, establishment of a tunnel on the user plane entity, and creation and configuration of a forwarding rule of the user plane entity. Functions of the session management entity include establishment of a user plane tunnel, configuration of a forwarding rule of the user plane entity, and the like. It should be noted that the first intermediate session management entity may be deployed separately or integrated into the session management entity. This is not limited in this application. The management area of the first intermediate session management entity may be determined by an operator during deployment as required. For example, the management area of the first intermediate session management entity is a province, a city, a tracking area, or a data center. This is not limited in this embodiment of the present invention.

Figure 1B:
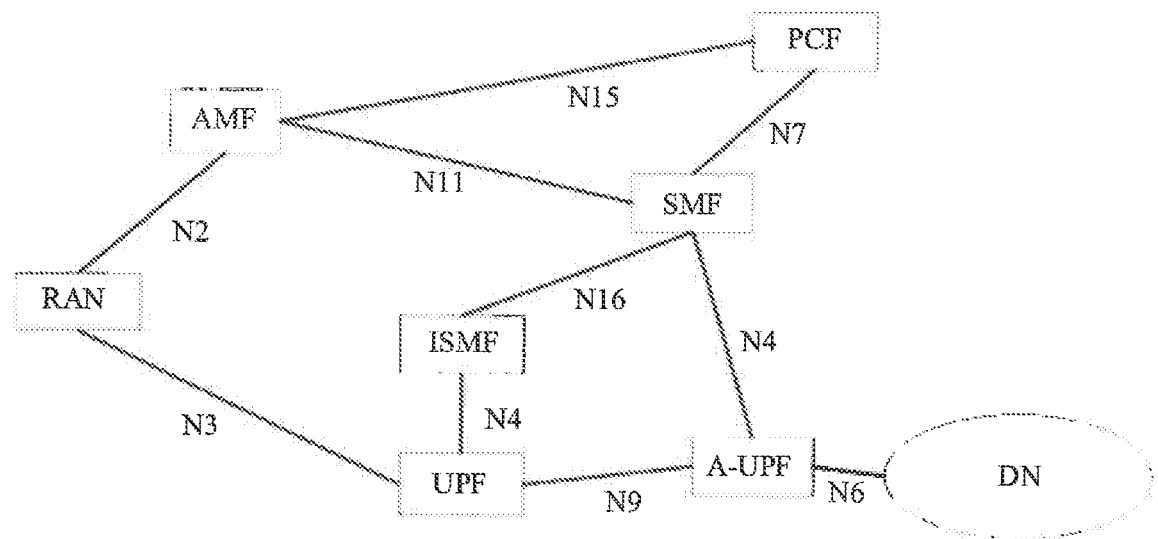

FIG. 1b is an architectural diagram of a 5G communications system. In the architectural diagram of the 5G communications system, an AMF (Access Management Function) corresponds to the access management entity in FIG. 1a, a RAN (Radio Access Network) corresponds to the access network in FIG. 1a, an SMF corresponds to the session management entity in FIG. 1a, an ISMF (Intermediate Session Management Function) corresponds to the first intermediate session management entity in FIG. 1a, a UPF corresponds to the user plane entity in FIG. 1a, an A-UPF (Anchor User Plane Function) corresponds to the anchor user plane entity in FIG. 1a, and a DN (Data Network) corresponds to the DN in FIG. 1a.

As shown in FIG. 1b, the RAN interworks with the AMF through an N2 interface; the RAN interworks with the UPF through an N3 interface; the two UPFs interwork with each other through an N9 interface, for example, the UPF interworks with the A-UPF in FIG. 1b through the N9 interface; the ISMF interworks with the UPF through an N4 interface, and the SMF also interworks with the A-UPF through an N4 interface; the A-UPF interworks with the DN through an N6 interface; the SMF interworks with the PCF through an N7 interface; the SMF may interwork with the ISMF through an N16 interface; the SMF interworks with the AMF through an N11 interface; and the AMF interworks with the PCF through an N15 interface.

Figure 2A:
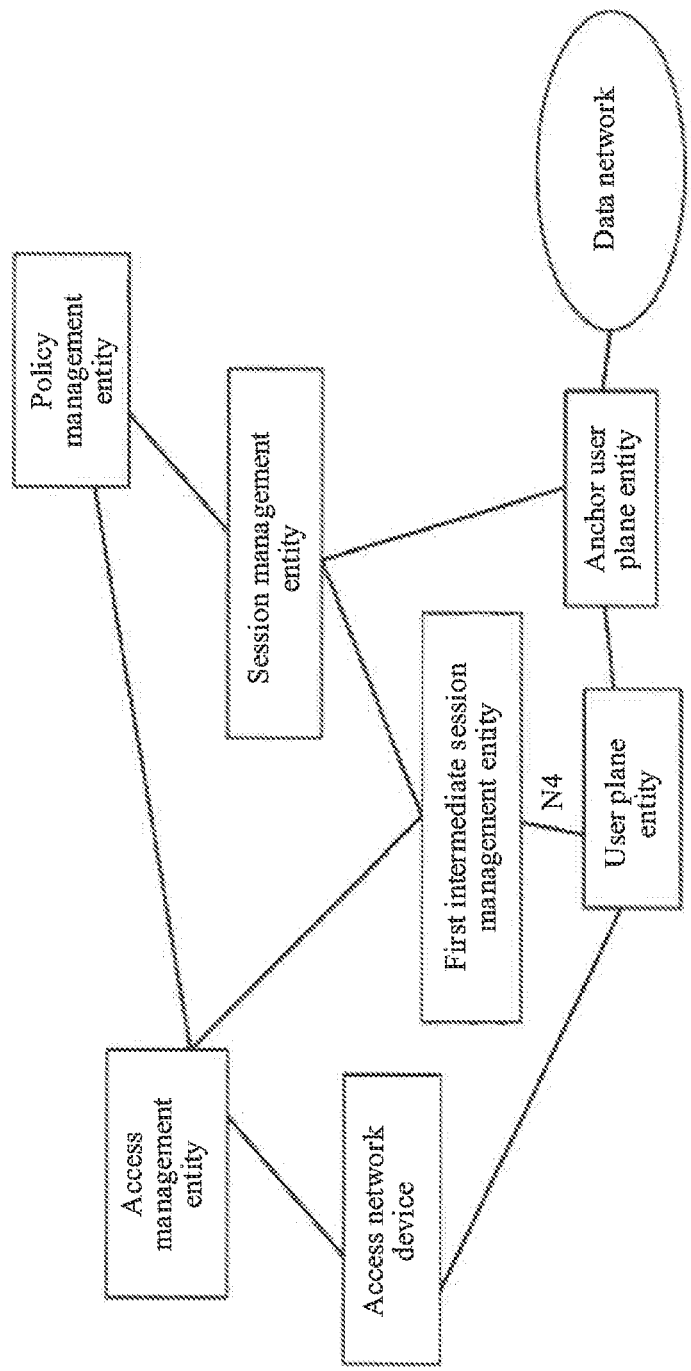
FIG. 2a is another diagram of a network architecture according to an embodiment of the present invention.

FIG. 2a is another structural diagram of a communications system according to an embodiment of the present invention. A structure of the communications system shown in FIG. 2a differs from that of the communications system in FIG. 1a only in that the access management entity does not interwork with the session management entity, and the access management entity interworks with the intermediate session management entity. For functions of each network element in FIG. 2a, refer to the descriptions in FIG. 1a, and details are not described herein again.

Figure 2B:
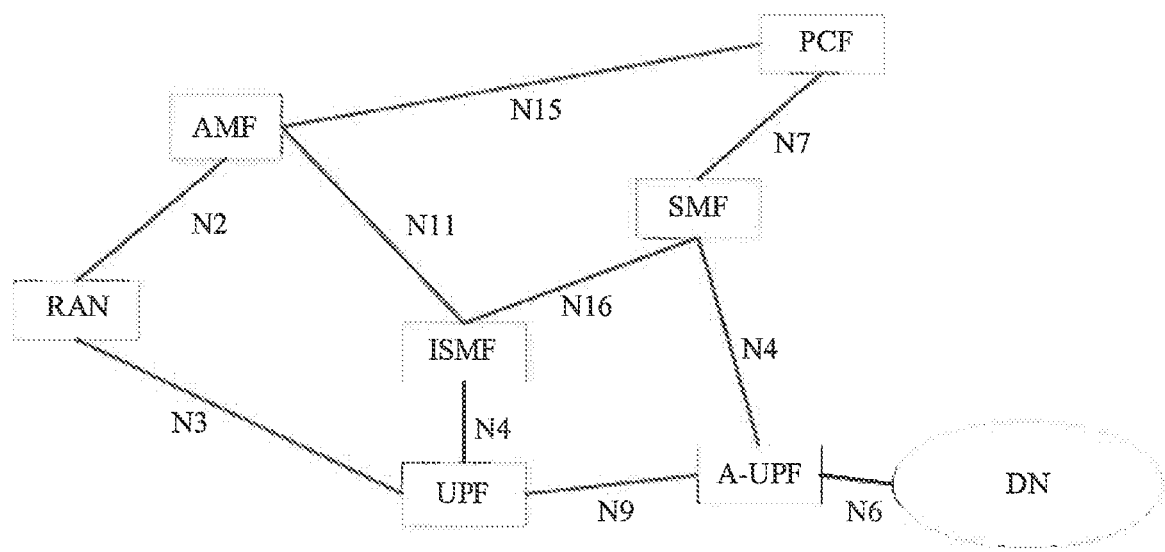

FIG. 2b is another architectural diagram of a 5G communications system. For a correspondence between a network element in FIG. 2b and the network element in FIG. 2a, refer to a correspondence between the network element in FIG. 1b and the network element in FIG. 1a, and details are not described herein again. The schematic structural diagram of the communications system in FIG. 2b differs from that of the communications system in FIG. 1b only in that the AMF does not interwork with the SMF, and the AMF interworks with the ISMF through an N11 interface.

An access network in this application may also be referred to as a base station device, and is a device deployed in a radio access network to provide a wireless communication function, including but not limited to: a base transceiver station (for example, a BTS (Base Transceiver Station)), a NodeB (NB), an evolved NodeB (eNodeB), a transmission node or a transmission/reception point (TRP or TP) or a next-generation NodeB (gNB) in an NR system, or a base station or a network device in future communications network, a relay station, an access point, an in-vehicle device, a wearable device, a wireless-fidelity (Wi-Fi) spot, a wireless backhaul node, a small cell, a micro cell, or the like.

In a current management method for user plane entities, one PDU session may correspond to a plurality of user plane entities, and different user plane entities may be located at different locations. The session management entity needs to simultaneously manage the user plane entities at the different locations, causing a relatively complex management process.

In view of this, based on the network architecture in FIG. 1a or FIG. 2a, an embodiment of the present invention provides a communications system, including: a network device and a first intermediate session management entity.

The network device is configured to select a first intermediate session management entity for a protocol data unit PDU session based on user equipment UE location information and PDU session requirement information. The network device in this embodiment is an access management entity or a session management entity. The first intermediate session management entity is configured to: receive the PDU session requirement information from the network device, and select a user plane entity based on the UE location information and the PDU session requirement information.

Optionally, based on the network architecture in FIG. 1a or FIG. 2a, the PDU session requirement information includes a data transmission mode and a local data network name DNN.

Optionally, based on the network architecture in FIG. 1a or FIG. 2a, the communications system further includes an anchor user plane entity, a local anchor user plane entity (not shown), a serving base station, and a branch point BP (not shown). The serving base station is an access network device, and the data transmission mode is a multihoming mode.

The first intermediate session management entity is configured to select a user plane entity within a management area of the first intermediate session management entity based on the UE location information and the PDU session requirement information, which is specifically: selecting a local anchor user plane entity for the PDU session, and selecting the branch point BP for the PDU session. The BP is configured to offload data packets sent by UE, the local anchor user plane entity is connected to a local data network DN indicated by the local DNN included in the PDU session requirement information, and the BP is connected to a serving base station indicated by the UE location information.

Optionally, based on the network architecture in FIG. 1a or FIG. 2a, the first intermediate session management entity is further configured to: receive an uplink offloading policy and an uplink routing policy from the network device, configure the uplink offloading policy onto a BP, and configure the uplink routing policy onto UE. The uplink offloading policy is used to control the BP to perform offloading based on a source address of a data packet sent by the UE, and the uplink routing policy is used to control the UE to use an IP address anchored to an anchor user plane entity or a local IP address anchored to a local anchor user plane entity, as the source address of the data packet.

Alternatively, the first intermediate session management entity is further configured to send, to the first intermediate session management entity, an IP address anchored to an anchor user plane entity and an uplink routing policy corresponding to the IP address anchored to the anchor user plane entity. The IP address anchored to the anchor user plane entity is configured to enable the first intermediate session management entity to generate an uplink offloading policy. The uplink routing policy corresponding to the IP address anchored to the anchor user plane entity is configured to enable the first intermediate session management entity to generate an uplink routing policy. The uplink offloading policy is used to control the BP to perform offloading based on the source address of the data packet sent by the UE. The uplink routing policy is used to instruct the UE to use the IP address anchored to the anchor user plane entity or a local IP address anchored to a local anchor user plane entity, as a source address for sending data.

Optionally, based on the network architecture in FIG. 1a or FIG. 2a, the communications system further includes a ULCL and a local DN (not shown), the data transmission mode is a ULCL mode, and the first intermediate session management entity is configured select a user plane entity within a management area of the first intermediate session management entity based on the UE location information and the PDU session requirement information, which is specifically: selecting a local anchor user plane entity for the PDU session, and selecting an uplink classifier ULCL for the PDU session. The ULCL is configured to offload application identifiers and/or quintuples of data packets sent by the UE, the local anchor user plane entity is connected to the local DN indicated by the local DNN, and the ULCL is connected to a serving base station indicated by the UE location information.

Optionally, based on the network architecture in FIG. 1a or FIG. 2a, the first intermediate session management entity is further configured to: receive an uplink forwarding policy from the network device, and configure the uplink forwarding policy onto the ULCL. The uplink forwarding policy is used to control the ULCL to perform offloading based on either or both of a quintuple and an application identifier.

Optionally, based on the network architecture in FIG. 1a or FIG. 2a, the PDU session requirement information further includes a PDU session type, where the PDU session type is an IP type.

The first intermediate session management entity is further configured to send a local IP address of the UE and either or both of location information of the local anchor user plane entity and location information of the local DN to the session management entity.

Optionally, based on the network architecture in FIG. 1a or FIG. 2a, the PDU session requirement information includes either or both of a session and service continuity SSC mode and a PDU session type.

Optionally, based on the network architecture in FIG. 1a or FIG. 2a, the network device being configured to select a first intermediate session management entity for a protocol data unit PDU session based on UE location information and PDU session requirement information is specifically: selecting an intermediate session management entity as the first intermediate session management entity, where the intermediate session management entity meets the PDU session requirement information and manages an area covering a serving base station indicated by the UE location information. The network device may be an access management entity or a session management entity.

Optionally, based on the network architecture in FIG. 1a or FIG. 2a, the network device is further configured to: if it is determined that an intermediate session management entity that meets the PDU session requirement information and that manages an area covering the serving base station indicated by the UE location information does not exist, select a second intermediate session management entity that meets the PDU session requirement information, and select a third intermediate session management entity that manages an area covering the serving base station indicated by the UE location information. The network device in this embodiment may be an access management entity or a session management entity.

Optionally, based on the network architecture in FIG. 1a or FIG. 2a, the network device being configured to select a first intermediate session management entity for a protocol data unit PDU session based on UE location information and PDU session requirement information is specifically: selecting an intermediate session management entity as the first intermediate session management entity, where the intermediate session management entity manages an area covering a serving base station indicated by the UE location information and a local DN indicated by the local DNN included in the PDU session requirement information and supports the data transmission mode. The network device in this embodiment may be an access management entity or a session management entity.

Optionally, the network device is further configured to: if it is determined that an intermediate session management entity that manages an area covering a serving base station indicated by the UE location information and a local DN indicated by the local DNN and supports the data transmission mode does not exist, select a second intermediate session management entity that manages an area covering the serving base station indicated by the UE location information, and select a third intermediate session management entity that manages an area covering the local DN indicated by the local DNN and that supports the data transmission mode. The network device in this embodiment may be an access management entity or a session management entity.

Optionally, based on the network architecture in FIG. 1a, the communications system further includes an access management entity and a policy management function entity. The network device is a session management entity. The access management entity is configured to select a session management entity. The network device is further configured to: determine the PDU session requirement information based on PDU session subscription information, or determine the PDU session requirement information based on PDU session subscription information and either or both of PDU session policy information and expected PDU session information; select an anchor user plane entity for the PDU session based on the PDU session requirement information; and determine that the anchor user plane entity is not connected to the serving base station indicated by the UE location information. The network device obtains the PDU session requirement information from the policy management function entity.

Optionally, based on the network architecture in FIG. 1a, the communications system includes an access management entity, and the network device is a session management entity.

The access management entity is configured to select a session management entity.

The session management entity is further configured to: determine the PDU session requirement information based on the PDU session subscription information; or determine the PDU session requirement information based on the PDU session subscription information and either or both of the PDU session policy information and the expected PDU session information; and determine that a management area of the session management entity does not cover the local ON indicated by the local DNN.

Optionally, based on the network architecture in FIG. 2a, the communications system further includes an access management entity, and the network device is a session management entity.

The access management entity is configured to: select the session management entity, and when the management area of the session management entity does not cover the serving base station indicated by the UE location information, select a fourth intermediate session management entity (not shown in FIG. 2a). The session management entity is further configured to: determine the PDU session requirement information based on the PDU session subscription information, or based on the PDU session subscription information and either or both of the PDU session policy information and the expected PDU session information, and determine that the fourth intermediate session management entity does not meet the PDU session requirement information; and the session management entity is further configured to send identifier information of the first intermediate session management entity to the access management entity.

Optionally, based on the network architecture in FIG. 2a, the communications system further includes a session management entity, and the network device is an access management entity. The session management entity is configured to: determine the PDU session requirement information based on PDU session subscription information; or determine the PDU session requirement information based on PDU session subscription information and either or both of PDU session policy information and expected PDU session information; and when it is determined that a fourth intermediate session management entity selected by the access management entity does not meet the PDU session requirement information, send the PDU session requirement information and a reselection indication message to the access management entity, where the reselection indication message is used to instruct the access management entity to select the first intermediate session management entity. The access management entity is further configured to: select a session management entity, and when the management area of the session management entity does not cover the serving base station indicated by the UE location information, select a fourth intermediate session management entity; and receive the PDU session requirement information and a reselection indication message from the session management entity.

Optionally, based on the network architecture in FIG. 2a, the communications system further includes a session management entity, and the network device is an access management entity. The access management entity is configured to: determine the PDU session requirement information based on PDU session subscription information, or based on PDU session subscription information and either or both of PDU session policy information and expected PDU session information, and send the PDU session requirement information to the access management entity. The access management entity is further configured to: select a session management entity, and when the management area of the session management entity does not cover the serving base station indicated by the UE location information, select a fourth intermediate session management entity (not shown in FIG. 2a); and determine that the fourth intermediate session management entity does not meet the PDU session requirement information from the session management entity.

Through implementation of this embodiment of the present invention, the intermediate session management entity is selected based on the UE location information and the PDU session requirement information. In this way, an intermediate session management entity near the UE can provide a service for the PDU session, and a delay of data transmission is reduced. In addition, the intermediate session management entity selects the user plane entity based on the UE location information and the PDU requirement information, and the intermediate session management entity manages only user plane entities within a specified area, and does not need to manage user plane entities in the entire PDU session, thereby reducing management complexity.

Figure 3:
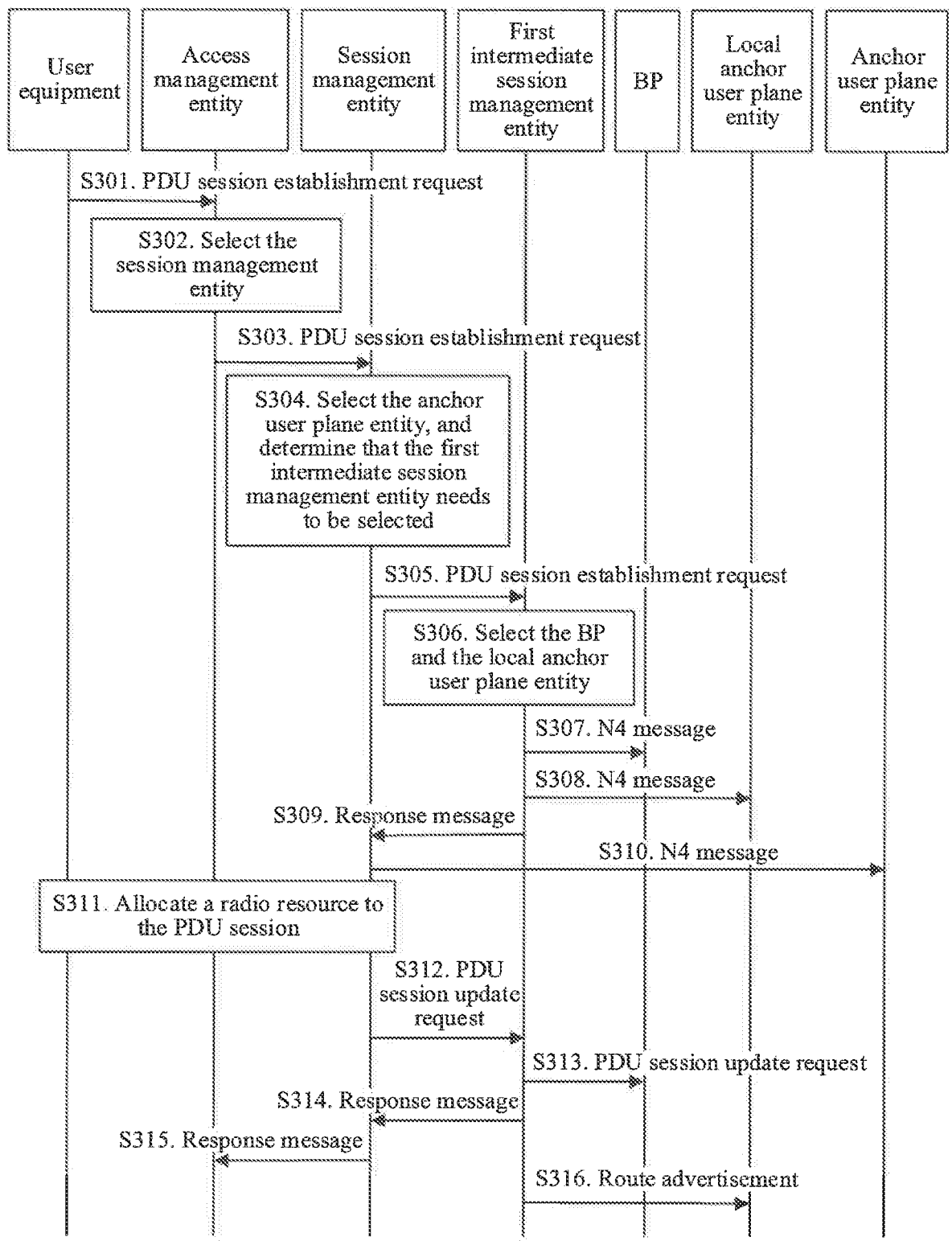
FIG. 3 is a schematic flowchart of a session management method according to an embodiment of the present invention.

FIG. 3 is a schematic flowchart of a session management method according to an embodiment of the present invention. The session management method in this embodiment is based on the network architecture in FIG. 1a, and the network device is an access management entity. The method includes but is not limited to the following steps.

S301. User equipment sends a PDU session establishment request to the access management entity, and the access management entity receives the PDU session establishment request sent by the user equipment.

Optionally, the user equipment sends the PDU session establishment request to the access management entity through a serving base station (not shown) to which the user equipment belongs, where the PDU session establishment request is used to create a PDU session. The PDU session establishment request carries expected PDU session information and UE location information. The expected PDU session information is a PDU session related parameter requirement requested by the user equipment, and the expected PDU session information includes one or more of a local DNN, network slice information, a PDU session type, and an SSC mode. The network slice information is used to describe related attributes of a network slice. For example, the network slice information includes one or more of a network slice type, a network slice identifier, and a network slice location. The expected PDU session information is a NAS (non-access stratum) message. The UE location information indicates a location of the UE in an access network, and the UE location information may be an identifier of a serving cell of the UE, or an identifier of a serving base station of the UE, or an identifier of a tracking area of the UE.

S302. The access management entity selects a session management entity.

Optionally, the access management entity obtains a parameter that can be parsed and that is carried in the PDU session establishment request. Parameters that can be parsed by the access management entity include the UE location information, the local DNN, and the network slice information. The access management entity selects a session management entity based on one or more of the UE location information, the local DNN, and the network slice information. The access management entity may use one or more of the UE location information, the local DNN, and the network slice information as an input parameter, and search a locally configured database or an NRF (Network Function Repository Function) based on the input parameter, to obtain an identifier of the selected session management entity.

S303. The access management entity sends a PDU session establishment request to the session management entity.

S304. The session management entity receives the PDU session request message sent by the access management entity, selects an anchor user plane entity, and determines that a first intermediate session management entity needs to be selected.

The session management entity selects a first intermediate session management entity based on the UE location information and PDU session requirement information.

Optionally, the session management entity parses the UE location information and the expected PDU session information that are carried in a PDU session management request; the session management entity obtains PDU session subscription information from a UDM (Unified Data Management), and obtains PDU session policy information from a policy control entity. For example, the PDU session policy information includes a QoS (Quality of Service) policy and a charging policy. The session management entity may determine the PDU session requirement information based on the PDU session subscription information; or determine the PDU session requirement information based on the PDU session subscription information and either or both of the expected PDU session information and the PDU session policy information. The PDU session requirement information indicates a PDU session related parameter requirement acceptable by a network side. The PDU session requirement information includes a PDU session type, an SSC mode, a local DNN, and a data transmission mode, where the data transmission mode is a multihoming mode or a ULCL mode. A management area is preset by the session management entity. The session management entity can manage only network elements (for example, a base station and a user plane entity) within the management area. The management area may be determined by an operator during deployment, and a size of the management area is not limited. For example, the management area of the session management entity is a province, a city, or a data center. The session management entity selects an anchor user plane entity, where the anchor user plane entity is configured to interface with a DN.

The session management entity determines whether the first intermediate session management entity needs to be selected, and the method of the determining may be:

a. determining, by the session management entity, whether the serving base station indicated by the UE location information is connected to the selected anchor user plane entity and if the serving base station is not connected to the selected anchor user plane entity, selecting, by the session management entity, a first intermediate session management entity based on the UE location information and the PDU session requirement information; or b. when the PDU session requirement information includes a local DNN and a transmission mode, determining, by the session management entity, whether the management area of the session management entity covers a data network indicated by the local DNN, and if the management area does not cover the data network, selecting, by the session management entity, a first intermediate session management entity based on the UE location information and the PDU session requirement information.

Optionally, a method for selecting the first intermediate session management entity by the session management entity may be:

using, by the session management entity, an intermediate session management entity as the first intermediate session management entity, where the intermediate session management entity meets the PDU session requirement information and manages an area covering the serving base station indicated by the UE location information.

Optionally, when the session management entity determines that an intermediate session management entity that meets the PDU session requirement information and that manages an area covering the serving base station indicated by the UE location information does not exist, the session management entity selects a second intermediate session management entity that meets the PDU session requirement information, and selects a third intermediate session management entity that manages the area covering the serving base station indicated by the UE location information. Both the second intermediate session management entity and the third intermediate session management entity provide a service for the PDU session.

When the PDU session requirement information includes the transmission mode and the local DNN, the session management entity uses the intermediate session management entity supporting both the DN indicated by the local DNN and the transmission mode, as the first intermediate session management entity.

Optionally, when the session management entity determines that an intermediate session management entity that manages an area covering the serving base station indicated by the UE location information and the DN indicated by the local DNN and that supports the transmission mode does not exist, the session management entity selects a second intermediate session management entity that manages an area covering the serving base station indicated by the UE location information, and selects a third intermediate session management entity that manages an area covering the local DN indicated by the local DNN and that supports the transmission mode. Both the second intermediate session management entity and the third intermediate session management entity provide a service for the PDU session.

S305. The session management entity sends a PDU session establishment request to the first intermediate session management entity.

The PDU session establishment request carries the UE location information and the PDU session requirement information. The session management entity may send the UE location information and the PDU session requirement information to the first intermediate session management entity by using the PDU session establishment request.

Optionally, when the data transmission mode is a multihoming mode, the session management entity sends an uplink offloading policy and an uplink routing policy to the first intermediate session management entity, where the uplink offloading policy is used to control a branch point BP to which the UE is anchored to perform offloading based on a source address of a data packet sent by the UE, and the uplink routing policy is used to control the UE to use an IP address anchored to an anchor user plane entity or a local IP address anchored to a local anchor user plane entity, as the source address of the data packet.

Optionally, the data transmission mode is a multihoming mode, and the session management entity sends, to the first intermediate session management entity, an IP address anchored to an anchor user plane entity and an uplink routing policy corresponding to the IP address anchored to the anchor user plane entity, where the IP address anchored to the anchor user plane entity is configured to enable the first intermediate session management entity to generate an uplink offloading policy, the uplink routing policy is used to enable the first intermediate session management entity to generate an uplink routing policy, and the uplink routing policy is used to instruct the UE to use the IP address anchored to the anchor user plane entity or a local IP address anchored to a local anchor user plane entity, as a source address for sending data.

Optionally, the data transmission mode is an uplink classifier ULCL mode, and the session management entity sends an uplink forwarding policy to the first intermediate session management entity, where the uplink forwarding policy is used to control an uplink classifier ULCL to which the UE is anchored to perform forwarding based on either or both of a quintuple and an application identifier of a data packet sent by the UE.

S306. The first intermediate session management entity receives the PDU session establishment request from the session management entity, and the first intermediate session management entity selects a BP and a local anchor user plane entity. S306 is an optional step.

Optionally, in this embodiment, an example in which the transmission mode is a multihoming mode is used. The first intermediate session management entity parses the UE location information and the PDU session requirement information in the PDU session establishment request. The first intermediate session management entity selects the local anchor user plane entity for the PDU session, and selects the branch point BP for the PDU session, where the BP is configured to offload data packets sent by UE, the local anchor user plane entity is connected to the local data network DN indicated by the local DNN included in the PDU session requirement information, and the BP is connected to the serving base station indicated by the UE location information.

Optionally, when the transmission mode is a ULCL mode, the first intermediate session management entity selects a local anchor user plane entity for the PDU session, and selects an uplink classifier ULCL for the PDU session, where the ULCL is configured to offload application identifiers and/or quintuples of data packets sent by UE, the local anchor user plane entity is connected to the local DN indicated by the local DNN, and the ULCL is connected to the serving base station indicated by the UE location information.

Optionally, when the management area of the first intermediate session management entity covers the serving base station of the UE, the local anchor user plane entity, a user plane entity connected to the serving base station, and the BP/ULCL may be a same user plane entity.

S307. The first intermediate session management entity sends an N4 message to the selected BR S307 is an optional step.

The N4 message in this step is a message transmitted through an N4 interface. The first intermediate session management entity allocates N3 uplink tunnel information and N9 downlink tunnel information, where the N3 uplink tunnel information is identifier information of a tunnel between the BP and the serving base station of the user equipment, and the N9 downlink tunnel information is identifier information of a tunnel between the BP and the local anchor user plane entity, and identifier information of a tunnel between the BP and the anchor user plane entity. The first intermediate session management entity sends the N3 uplink tunnel information and the N9 downlink tunnel information to the BP by using the N4 message. The BP receives the N3 uplink tunnel information and the N9 downlink tunnel information from the first intermediate session management entity, and creates an N3 tunnel and an N9 tunnel on a local path.

It should be noted that, when the transmission mode is a ULCL mode, the first intermediate session management entity sends an N4 message to the ULCL, where the N4 message includes N3 uplink tunnel information and N9 downlink tunnel information. The ULCL receives the N4 message, and creates an N3 tunnel and an N9 tunnel.

S308. The first intermediate session management entity sends the N4 message to the selected local anchor user plane entity. S308 is an optional step.

The first intermediate session management entity allocates a local IP address and N9 uplink and downlink tunnel information to the local anchor user plane entity, and the first intermediate session management entity sends the local IP address and the N9 uplink and downlink tunnel information to the local anchor user plane entity by using the N4 message. The anchor user plane entity receives the N4 message and creates an N9 tunnel on the local path.

S309. The first intermediate session management entity sends a response message to the session management entity. S309 is an optional step.

The response message may carry the N9 downlink tunnel information of the BP. In addition, when a session type of the PDU session is an IP type, the first intermediate session management entity may further send location information and/or the local IP address of the local anchor user plane entity to the session management entity.

S310. The session management entity sends the N4 message to the anchor user plane entity. S310 is an optional step.

The session management entity allocates an IP address to the PDU session and allocates the N9 uplink and downlink tunnel information to the anchor user plane entity, and sends the allocated IP address and N9 uplink and downlink tunnel information to the anchor user plane entity by using an N4 message. The anchor user plane entity receives the N4 message and creates an N9 tunnel to the BP.

S311. Allocate a radio resource to the PDU session. S311 is an optional step.

The session management entity requests an access network (not shown) to create a user plane tunnel and allocate an air interface resource to the PDU session, and configures a QoS policy of the PDU session onto the access network. The access network sends N3 downlink tunnel information to the session management entity.

S312. The session management entity sends a PDU session update request to the first intermediate session management entity. S312 is an optional step.

The session management entity sends the N3 downlink tunnel information to the first intermediate session management entity. When the session type of the PDU session is an IP type, the session management entity may further send, to the first intermediate session management entity, the IP address allocated by the session management entity.

S313. The first intermediate session management entity sends the PDU session update request to the BR S313 is an optional step.

The PDU session update request includes the N3 downlink tunnel information, the N9 uplink tunnel information of the anchor user plane entity, and N9 uplink tunnel information of the local anchor user plane entity. The BP receives the PDU session update request and updates the PDU session. If the uplink offloading policy needs to be updated, the PDU session update request further includes an updated uplink offloading policy.

S314. The first intermediate session management entity sends a response message to the session management entity. The response message indicates completion of updating the PDU session. S314 is an optional step.

S315. The session management entity receives the response message from the first intermediate session management entity, and sends the response message to the access management entity. S315 is an optional step.

S316. The first intermediate session management entity sends a route advertisement to the user equipment through the local anchor user plane entity. S316 is an optional step.

The transmission mode in this step is a multihoming mode. The route advertisement carries the uplink routing policy and the IP address allocated by the session management entity. The uplink routing policy is used to control the UE to select a source address when the UE sends a data packet, where the source address is the IP address allocated by the session management entity or the local IP address allocated by the first intermediate session management entity.

It should be noted that when the user plane entity receives downlink data, the user plane entity may be any type of user plane entity. The user plane entity determines that there is no downlink N3 tunnel information, and the user plane entity sends a downlink data notification to the first intermediate session management entity. The first intermediate session management entity forwards the received downlink data notification to the session management entity, and the session management entity triggers a paging process. After receiving the downlink N3 tunnel information sent by the serving base station of the UE, the session management entity sends a PDU session update request to the first intermediate session management entity. The first intermediate session management entity receives the PDU session update request, and learns of the downlink N3 tunnel information from the PDU session update request. The first intermediate session management entity notifies the user plane entity of the downlink N3 tunnel information, and the user plane entity receives the downlink N3 tunnel information, and then sends uplink data.

Through implementation of this embodiment of the present invention, the session management entity and the intermediate session management entity are responsible for managing only user plane entities within respective management areas, and do not need to manage all user plane entities in the entire PDU session, thereby reducing a quantity of messages exchanged with the user plane entity and reducing workloads.

Figure 4:
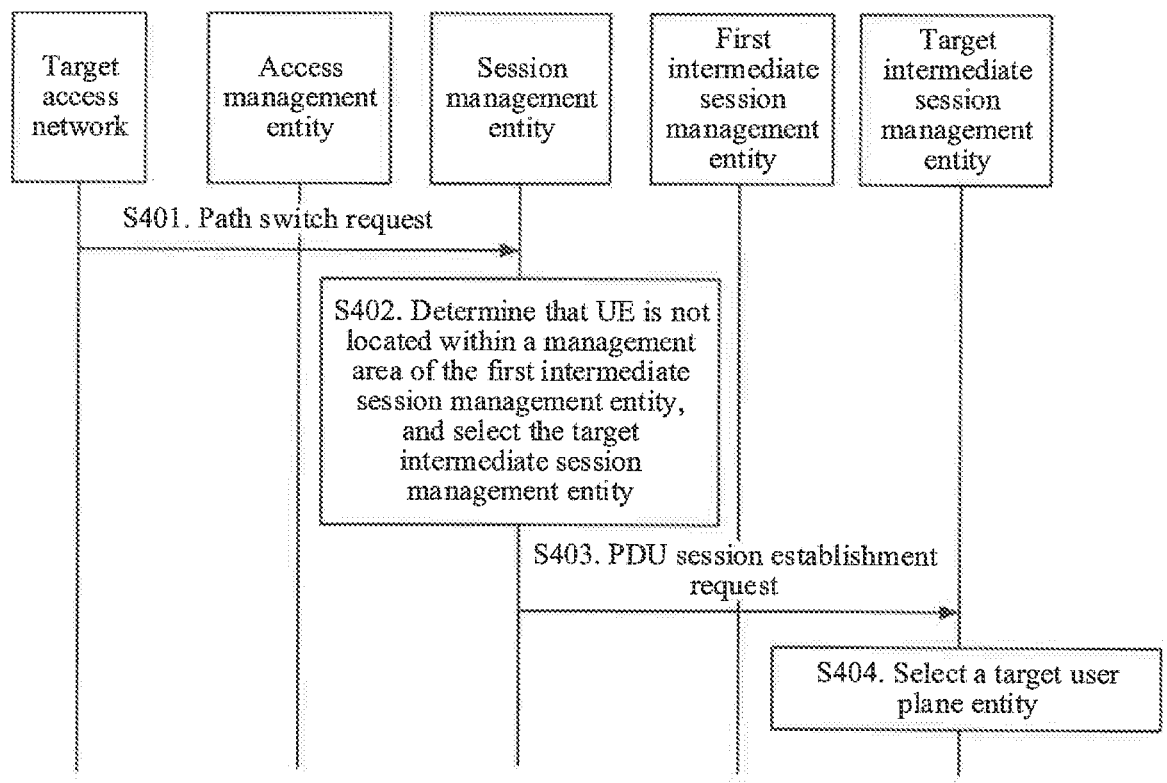
FIG. 4 is a schematic flowchart of another session management method according to an embodiment of the present invention.

FIG. 4 is a schematic flowchart of a session management method according to an embodiment of the present invention. In this embodiment, a handover process in the architecture shown in FIG. 1a is described. Before a handover, a source access network of UE that is a serving base station (not shown), a source intermediate session management entity (a first intermediate session management entity), a source user plane entity, and an anchor user plane entity provide a service for a PDU session. When the handover occurs, the method includes but is not limited to the following steps.

S401. A target access network sends a path switch request to a session management entity through an access management entity. S401 is an optional step.

After the UE is handed over from the source access network to the target access network, the target access network sends the path switch request to the session management entity through the access management entity, where the path switch request carries UE location information, and the UE location information may be an identifier of a base station on which the UE camps or an identifier of a cell on which the UE camps.

S402. The session management entity receives the path switch request and determines, based on the UE location information, that the UE is not located within a management area of the first intermediate session management entity, and selects a target intermediate session management entity.

PDU session requirement information of the PDU session is stored in the session management entity, and the session management entity selects the target intermediate session management entity based on the UE location information and the PDU session requirement information. For a specific selection process, refer to the description of S304 in FIG. 3, and details are not described herein again.

S403. The session management entity sends a PDU session establishment request to the target intermediate session management entity.

The PDU session establishment request carries the UE location information and the PDU session requirement information.

S404. The target intermediate session management entity receives the PDU session establishment request, and selects a target user plane entity based on the UE location information and the PDU session requirement information. S404 is an optional step. For a detailed process in which the target intermediate session management entity selects the target user plane entity based on the UE location information and the PDU session requirement information, refer to the description of S306 in FIG. 3, and details are not described herein again.

It should be noted that the target intermediate session management entity sends an N4 message to the selected target user plane entity, and the target user plane entity receives the N4 message from the target intermediate session management entity. The target user plane entity creates an N9 tunnel to the anchor user plane entity, and creates an N3 tunnel to the target access network. The target intermediate session management entity sends a response message to the session management entity, where the response message carries identifier information of the created N3 tunnel and identifier information of the created N9 tunnel. The session management entity receives the identifier information of the N3 tunnel and the identifier information of the N9 tunnel that are sent from the intermediate session management entity, and updates the identifier information of the N9 tunnel of the anchor user plane entity. The session management entity sends a switch response message to the access management entity, and the access management entity receives the switch response message from the session management entity, and learns that the tunnel update process is completed.

Through implementation of this embodiment of the present invention, when a location of the UE is updated, the session management entity selects the intermediate session management entity and the user plane entity near the UE to provide a service for the UE, thereby reducing a delay during data transmission. In addition, the session management entity and the intermediate session management entity are responsible for managing only user plane entities within respective management areas, and do not need to manage all user plane entities in the entire PDU session, thereby reducing a quantity of messages exchanged with the user plane entity and reducing workloads.

Figure 5:
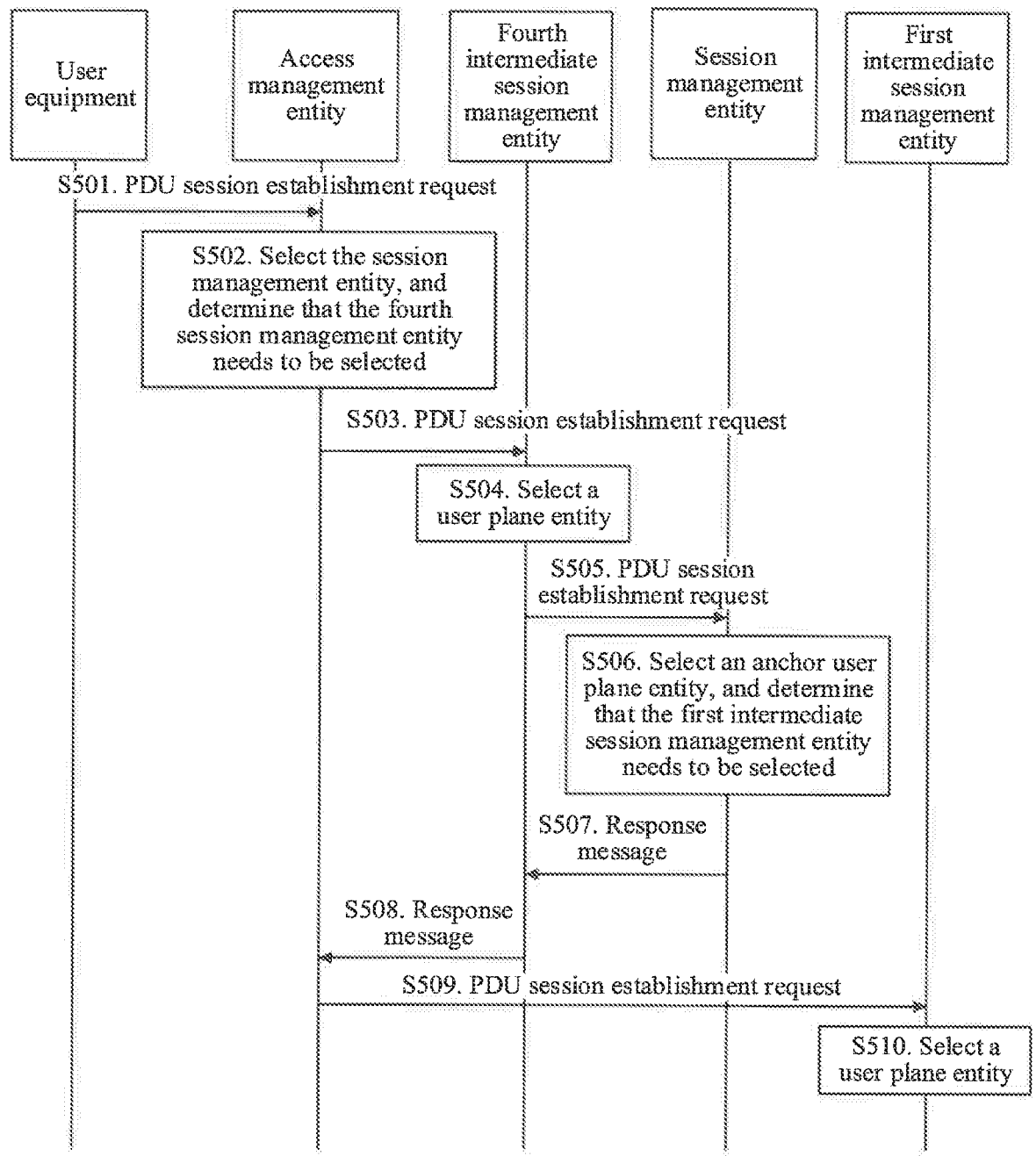
FIG. 5 is a schematic flowchart of another session management method according to an embodiment of the present invention.

FIG. 5 is a schematic flowchart of a session management method according to an embodiment of the present invention. This embodiment of the present invention is applicable to the architecture in FIG. 2a, and the method includes but is not limited to the following steps.

S501. User equipment sends a PDU session establishment request to an access management entity. S501 is an optional step.

The user equipment sends the PDU session establishment request to the access management entity through a serving base station (not shown) to which the user equipment belongs, where the PDU session establishment request is used to create a PDU session. The PDU session establishment request carries expected PDU session information and UE location information. The expected PDU session information is a PDU session related parameter requirement requested by the user equipment, and the expected PDU session information includes one or more of a local DNN, network slice information, a PDU session type, and an SSC mode. The network slice information is used to describe related attributes of a network slice. For example, the network slice information includes one or more of a network slice type, a network slice identifier, and a network slice location. The expected PDU session information is a NAS (Non-Access Stratum) message. The UE location information indicates a location of the UE in an access network, and the UE location information may be an identifier of a serving cell of the UE, or an identifier of a serving base station of the UE, or an identifier of a tracking area of the UE.

S502. The access management entity receives the PDU session establishment request from the UE, selects a session management entity, and determines that a fourth session management entity needs to be selected. S502 is an optional step.

The access management entity obtains a parameter that can be parsed and that is carried in the PDU session establishment request. Parameters that can be parsed by the access management entity include the UE location information, the local DNN, and the network slice information. The access management entity selects a session management entity based on one or more of the UE location information, the local DNN, and the network slice information. The access management entity may use one or more of the UE location information, the local DNN, and the network slice information as an input parameter, and search a locally configured database or an NRF (Network Function Repository Function) based on the input parameter, to obtain an identifier of the selected session management entity. The access management entity determines whether a management area of the session management entity covers the serving base station indicated by the UE location information and if the management area does not cover the serving base station, the access management entity determines that a fourth intermediate session management entity needs to be preliminarily selected. A method for selecting the fourth intermediate session management entity by the access management entity may be: selecting a fourth intermediate session management entity based on one or more of the UE location information, the local DNN, and the network slice information.

S503. The access management entity sends a PDU session establishment request to the fourth intermediate session management entity. The PDU session establishment request further carries identifier information of the session management entity. S503 is an optional step. Identifier information of a first intermediate session management entity may be address information, location information, or an ID (Identity, identity information).

S504. The fourth intermediate session management entity receives the PDU session establishment request from the access management entity, and selects a user plane entity. S504 is an optional step.

The fourth intermediate session management entity obtains the expected PDU session information, the UE location information, and the identifier information of the session management entity that are carried in the PDU session request message, and the fourth intermediate session management entity selects the user plane entity (not shown) based on the expected PDU session information and the UE location information. A method for selecting the user plane entity may be: selecting, by the fourth intermediate session management entity, a user plane entity within a management area, where the selected user plane entity is connected to the serving base station of the UE. The fourth intermediate session management entity sends an N4 message to the selected user plane entity, and the user plane entity receives the N4 message and creates an N3 downlink tunnel and an N9 uplink tunnel.

S505. The fourth intermediate session management entity sends the PDU session establishment request to the session management entity. S505 is an optional step.

S506. The session management entity receives the PDU session establishment request from the fourth intermediate session management entity, selects an anchor user plane entity, and determines that a first intermediate session management entity needs to be selected.

The session management entity obtains PDU session subscription information from a UDM, and obtains PDU session policy information from a policy control entity. The session management entity may determine the PDU session requirement information based on the PDU session subscription information; or determine the PDU session requirement information based on the PDU session subscription information and either or both of the expected PDU session information and the PDU session policy information. The PDU session requirement information indicates a PDU session related parameter requirement acceptable by a network side. The PDU session requirement information includes a PDU session type, an SSC mode, a local DNN, and a data transmission mode, where the transmission mode is a multihorning mode or a ULCL mode. A management area is preset by the session management entity. The session management entity can manage only network elements (for example, a base station and a user plane entity) within the management area. The management area may be determined by an operator during deployment, and a size of the management area is not limited. For example, the management area of the session management entity is a province, a city, or a data center. The session management entity selects an anchor user plane entity, where the anchor user plane entity is configured to interface with a DN.

The session management entity determines whether the fourth intermediate session management entity meets the PDU session requirement information; and if the fourth intermediate session management entity does not meet the PDU session requirement information, the session management entity selects a first intermediate session management entity based on the UE location information and the PDU session requirement information. For a method for determining whether to select the first intermediate session management entity and a method for selecting the first intermediate session management entity, refer to the description of S304 in FIG. 3, and details are not described herein again.

After selecting the first intermediate session management entity, the session management entity notifies the first intermediate session management entity of the UE location information and the PDU session requirement information. Optionally, the session management entity may notify the first intermediate session management entity of the UE location information and the PDU session requirement information by performing a process of S507 to S509.

S507. The session management entity sends a response message to the fourth intermediate session management entity.

Because the first intermediate session entity is reselected in S506, the response message carries the PDU session requirement information, the UE location information, and identifier information of the first intermediate session management entity. The identifier information of the first intermediate session management entity may be address information, location information, or an ID.

S508. The fourth intermediate session management entity receives the response message from the session management entity, and sends the response message to the access management entity.

The fourth intermediate session management entity deletes a local session, where the response message carries the identifier information of the first intermediate session management entity and the PDU session requirement information.

S509. The access management entity receives the response message from the fourth intermediate session management entity, and sends a PDU session establishment request to the first intermediate session management entity. The PDU session establishment request carries the UE location information and the PDU session requirement information.

S510. The first intermediate session management entity receives the PDU session establishment request from the access management entity, obtains the UE location information and the PDU session requirement information, and selects a user plane entity based on the UE location information and the PDU session requirement information. For a process of selecting the user plane entity, refer to the description of S306 in FIG. 3, and details are not described herein again.

The first intermediate session management entity sends an N4 message to the selected user plane entity, and the user plane entity receives the N4 message and creates a local session as indicated by the N4 message. The first intermediate session management entity sends the PDU session establishment request to the session management entity. The session management entity sends the N4 message to the anchor user plane entity, and the anchor user plane entity receives the N4 message from the session management entity and creates a session as indicated by the N4 message.

Optionally, after S509, the first intermediate session management entity sends the PDU session establishment request to the session management entity.

The session management entity sends the N4 message to the selected anchor user plane entity, and the anchor user plane entity receives the N4 message and creates a local session. After successfully creating the local session, the anchor user plane entity sends a response message to the session management entity, where the response message indicates successful creation of the local session. The session management entity receives the response message, and sends the response message to the first intermediate session management entity. The first intermediate session management entity receives the response message from the session management entity, and the first intermediate session management entity sends the received response message to the access management entity. The access management entity receives the response message from the first intermediate session management entity.

Optionally, when determining that the first intermediate session management entity needs to be selected, the session management entity sends a reselection indication message and the PDU session requirement information to the access management entity. The access management entity receives the reselection indication message and the PDU session requirement information from the session management entity, and selects the first intermediate session management entity based on the UE location information and the PDU session requirement information. For a selection method, refer to the description of S304 in FIG. 3, and details are not In another optional implementation, the access management entity receives the PDU session requirement information from the session management entity. When determining that the first intermediate session management entity needs to be selected, the access management entity selects the first intermediate session management entity based on the UE location information and the PDU session requirement information.

Optionally, when the access management entity determines that the first intermediate session management entity does not need to be selected, the access management entity sends an N4 message to the selected anchor user plane entity, and the anchor user plane entity receives the N4 message and creates an N3 tunnel and an N9 tunnel. The session management entity sends a response message to the fourth intermediate session management entity, where the response message carries the PDU session requirement information and the UE location information. The fourth intermediate session management entity receives the response message from the session management entity, and obtains the PDU session requirement information. The fourth intermediate session management entity determines whether the user plane entity selected in S504 meets the PDU session requirement information. If the user plane entity does not meet the PDU session requirement information, the fourth Intermediate session management entity reselects a user plane entity based on the UE location information and the PDU session requirement information. For a selection method, refer to the description of S306 in FIG. 3, and details are not described herein again.

Through implementation of this embodiment of the present invention, the session management entity and the intermediate session management entity are responsible for managing only user plane entities within respective management areas, and do not need to manage all user plane entities in the entire PDU session, thereby reducing a quantity of messages exchanged with the user plane entity and reducing workloads.

Figure 6:
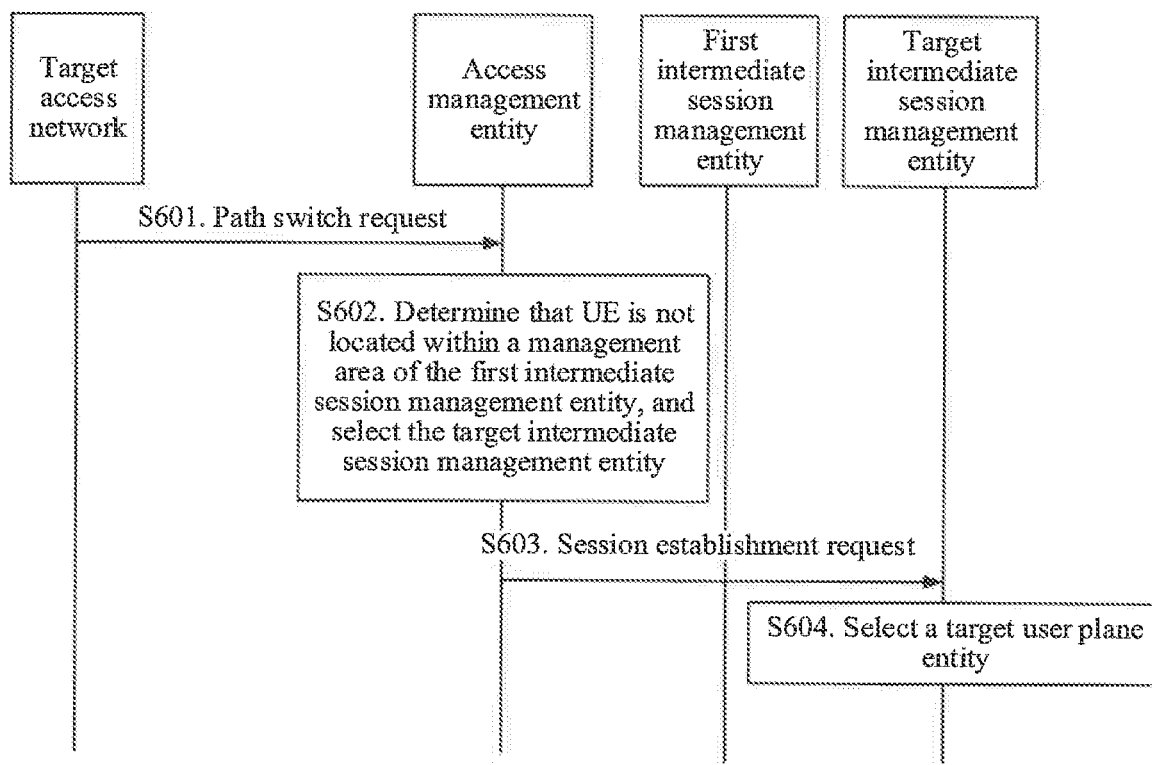
FIG. 6 is a schematic flowchart of another session management hod according to an embodiment of the present invention.

FIG. 6 is a schematic flowchart of a session management method according to an embodiment of the present invention. In this embodiment, a handover process in the architecture shown in FIG. 2a is described. Before a handover, a source access network of UE that is a serving base station (not shown), a source intermediate session management entity (a first intermediate session management entity), a source user plane entity, and an anchor user plane entity provide a service for a PDU session. When the handover occurs, the method includes but is not limited to the following steps.

S601. A target access network sends a path switch request to an access management entity, where the path switch request carries UE location information.

S602. The access management entity receives the path switch request from the target access network, determines that the UE is not located within a management area of the first intermediate session management entity, and selects a target intermediate session management entity. For a method for selecting the target intermediate session management entity, refer to the description of S402 in FIG. 4.

S603. The access management entity sends a session establishment request to the target intermediate session management entity.

S604. The target intermediate session management entity receives the session establishment request from the access management entity, and selects a target user plane entity. For a method for selecting the target user plane entity, refer to the description of S404 in FIG. 4. S604 is an optional step.

Optionally, the access management entity receives new PDU session requirement information sent from the session management entity, and the session management entity sends the new PDU session requirement information to the access management entity through the first intermediate session management entity. The access management entity determines whether the first intermediate session management entity meets the new PDU session requirement information. If the first intermediate session management entity does not meet the new PDU session requirement information, the access management entity selects a target intermediate session management entity. For a method for selecting the target intermediate session management entity, refer to the description of S402 in FIG. 4.

Through implementation of this embodiment of the present invention, the access management entity selects the intermediate session management entity and the user plane entity near the UE to provide a service for the UE, thereby reducing a delay during data transmission. In addition, the session management entity and the intermediate session management entity are responsible for managing only user plane entities within respective management areas, and do not need to manage all user plane entities in the entire PDU session, thereby reducing a quantity of messages exchanged with the user plane entity and reducing workloads.

Figure 9:
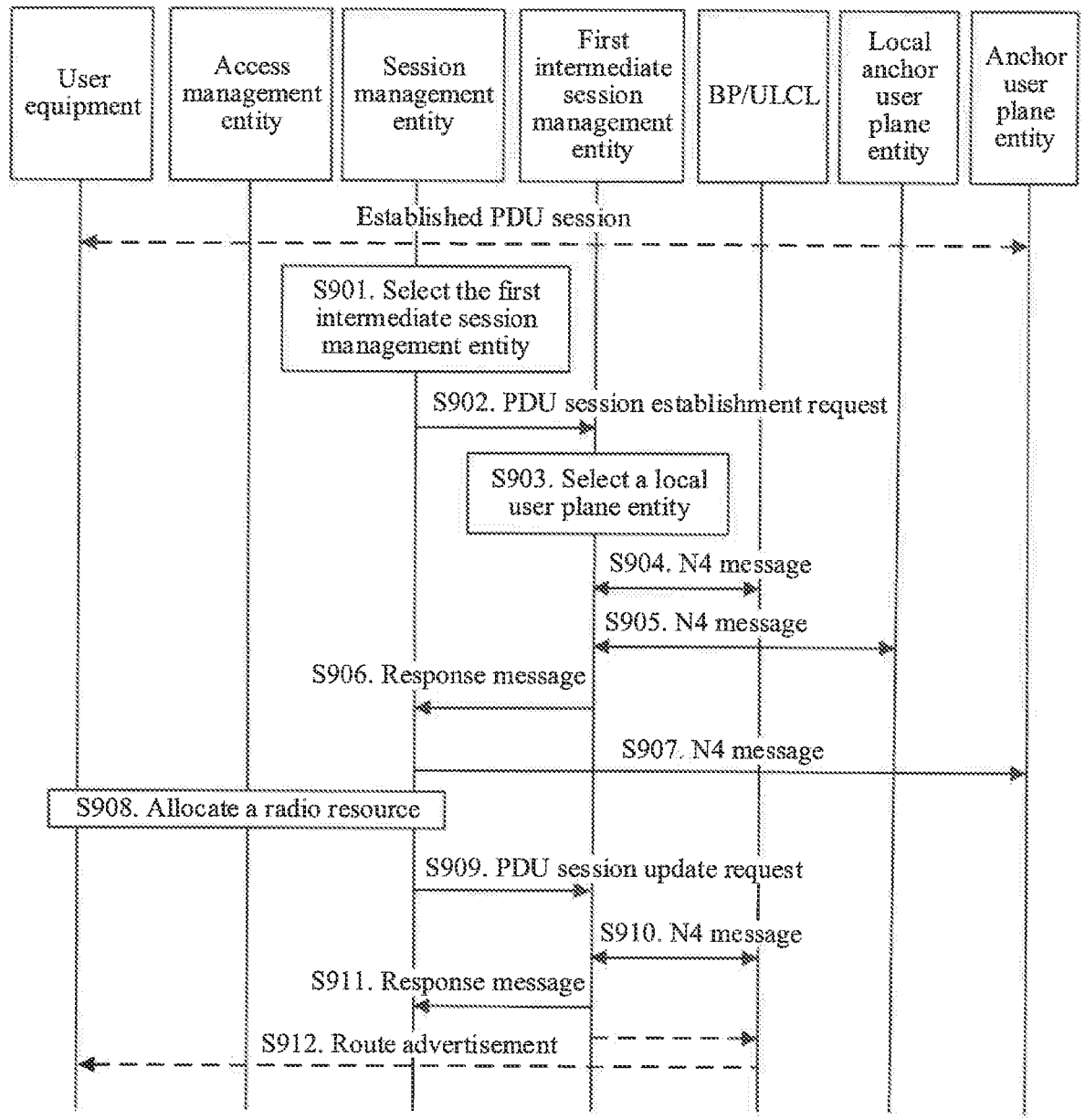
FIG. 9 is a schematic flowchart of another session management method according to an embodiment of the present invention.

FIG. 9 is a schematic flowchart of a session management method according to an embodiment of the present invention. The session management method in this embodiment is based on the network architecture in FIG. 1a. In this embodiment, it is assumed that UE has established a PDU session, the PDU session is served by a session management entity, and a user plane of the PDU session is served by an anchor user plane entity. The method includes but is not limited to the following steps.

S901. The session management entity selects a first intermediate session management entity.

Specifically, PDU session requirement information includes one or more of a PDU session type, an SSC mode, a local DNN, and a data transmission mode, where the data transmission mode is a multihoming mode or a ULCL mode.

The session management entity determines a local DNN in the PDU session requirement information based on information from an application function and UE location information, where the information from the application function includes deployment information of an application, for example, local DNs in which the application is deployed. A local DNN identifier is used in the information. The session management entity selects, based on a UE location and one or more local DNs in which the application deployed, a local DN near the UE location, and uses a local DNN identifier corresponding to the selected local DN, as the local DNN in the PDU session requirement information. It should be noted that other information in the PDU session requirement information, for example, information such as a data transmission mode and a PDU session type, is still determined by using the method in S304, and details are not described herein again.

Optionally, before selecting the first intermediate session management entity, the session management entity needs to determine whether the first intermediate session management entity needs to be selected. A method for determining, by the session management entity, whether the first intermediate session management entity needs to be selected may be:

when the session management entity determines, based on the PDU session requirement information, that a UPF connected to the local DN is not controlled by the session management entity, selecting (or obtaining), by the session management entity, the first intermediate session management entity based on the PDU session requirement information. Optionally, the session management entity obtains the first intermediate session management entity based on the UE location information and the PDU session requirement information.

Optionally, a method for selecting the first intermediate session management entity by the session management entity may be:

a. using, by the session management entity, an intermediate session management entity that meets the PDU session requirement information, as the first intermediate session management entity; or b. selecting, by the session management entity, the first intermediate session management entity with reference to the UE location information and the PDU session requirement information, and using, by the session management entity, an intermediate session management entity as the first intermediate session management entity, where the intermediate session management entity meets the PDU session requirement information and manages an area covering a serving base station indicated by the UE location information; or c. when the PDU session requirement information includes a transmission mode and a local DNN, using, by the session management entity, the intermediate session management entity supporting both a DN indicated by the local DNN and the transmission mode, as the first intermediate session management entity; or d. when the PDU session requirement information includes only a local DNN, using, by the session management entity, the intermediate session management entity supporting a DN indicated by the local DNN, as the first intermediate session management entity; or e. when the PDU session requirement information includes only a transmission mode, using, by the session management entity, the intermediate session management entity supporting the transmission mode, as the first intermediate session management entity.

Optionally, the session management entity considers both the UE location information and the PDU session requirement information, and when the PDU session requirement information includes a local DNN and a transmission mode, the session management entity selects the first intermediate session management entity. For example, the session management entity selects an intermediate session management entity as the first intermediate session management entity, where the intermediate session management entity manages an area covering a serving base station indicated by the UE location information and supports a DN indicated by the local DNN and supports the transmission mode. A method for selecting the first intermediate session management entity based on other combinations is similar to the foregoing method, and details are not described in the present disclosure again.

S902. The session management entity sends a PDU session establishment request to the first intermediate session management entity, and the first intermediate session management entity receives the PDU session establishment request from the session management entity.

The PDU session establishment request carries the UE location information. The session management entity may use the PDU session establishment request to send the UE location information to the first intermediate session management entity. The session management entity selects, based on the UE location information, a user plane entity such as a BP or a local anchor user plane entity.

Optionally, the PDU session establishment request further carries a data transmission mode, where the data transmission mode is a multihoming mode or a ULCL mode.

Optionally, when the data transmission mode is a multihoming mode, the session management entity sends an uplink offloading policy to the first intermediate session management entity, where the uplink offloading policy is used to control a branch point BP to which the UE is anchored to perform offloading based on a source address of a data packet sent by the UE.

Optionally, when the data transmission mode is a multihoming mode, the session management entity sends, to the first intermediate session management entity, an IP address of UE (an IP address of remote UE) anchored to an anchor user plane entity. The IP address of the UE (the IP address of the remote UE) anchored to the anchor user plane entity is configured to enable the first intermediate session management entity to generate an uplink offloading policy. The uplink offloading policy is used by a branching point UPF to forward a received uplink data packet based on a source address.

Optionally, when the data transmission mode is an uplink classifier ULCL mode, the session management entity sends an uplink forwarding policy to the first intermediate session management entity, where the uplink forwarding policy is used to control an uplink classifier ULCL to which the UE is anchored to perform forwarding based on either or both of a quintuple and an application identifier of a data packet sent by the UE.

Optionally, when the data transmission mode is an uplink classifier ULCL mode, the session management entity sends application information of an application that accesses a local DN to the first intermediate session management entity, where the application information is at least one of an application identifier or a quintuple corresponding to the application, and the application information is used instruct the first intermediate session management entity to determine an uplink forwarding policy based on the application information, and the uplink forwarding policy is used to control an uplink classifier ULCL to which the UE is anchored to perform forwarding based on either or both of the quintuple and the application identifier of the data packet sent by the UE.

Optionally, the session management entity sends information about routing between the local anchor user plane entity and the local DN identified by the local DNN to the first intermediate session management entity, where the information about routing is used to determine a forwarding path between the local anchor user plane entity and the local DN. The first intermediate session management entity determines, based on the information about routing, a forwarding rule on an interface that is of the local anchor user plane entity and that is oriented to the local DN.

Optionally, the session management entity further sends either or both of the PDU session type and the local DNN to the first intermediate session management entity, so that the first intermediate session management entity selects a local user plane entity based on the PDU session type and/or the local DNN.

S903. The first intermediate session management entity sends a local user plane entity.

Optionally, when the transmission mode is a multihoming mode, the first intermediate session management entity parses the UE location information in the PDU session establishment request. The first intermediate session management entity selects a local anchor user plane entity for the PDU session, and selects a BP for the PDU session, where the BP is configured to offload data packets sent by the UE, the local anchor user plane entity is connected to the local data network DN indicated by the local DNN, and the BP is connected to the serving base station indicated by the UE location information.

Optionally, when the transmission mode is a ULCL mode, the first intermediate session management entity selects a local anchor user plane entity for the PDU session, and selects an uplink classifier ULCL for the PDU session, where the ULCL is configured to offload application identifiers and/or quintuples of data packets sent by UE, the local anchor user plane entity is connected to the local DN indicated by the local DNN, and the ULCL is connected to the serving base station indicated by the UE location information.

Optionally, when the management area of the local anchor user plane entity covers the serving base station of the UE, the local anchor user plane entity, a user plane entity connected to the serving base station, and the BP/ULCL may be the same user plane entity.

The first intermediate session management entity selects a BP or a ULCL based on the UE location information in the following manner:

the first intermediate session management entity selects a user plane entity connected to the serving base station indicated by the UE location information and uses the user plane entity as a BP or a ULCL.

Optionally, when the PDU session establishment request received by the first intermediate session management entity from the session management entity includes one or more of a transmission mode, a local DNN, and a PDU session type, the first intermediate session management entity may further select a local session anchor user plane entity based on one or more of the transmission mode, the local DNN, and the PDU session type.

Optionally, the first intermediate session management entity selects a local session anchor user plane entity based on the data transmission mode, and the first intermediate session management entity selects a user plane entity supporting the data transmission mode indicated by the session management entity, as the local session anchor user plane entity.

Optionally, the first intermediate session management entity selects a local session anchor user plane entity based on the local DNN, and the first intermediate session management entity selects a user plane entity supporting the local DNN indicated by the session management entity, as the local session anchor user plane entity.

Optionally, the first intermediate session management entity selects a local session anchor user plane entity based on the PDU session type, and the first intermediate session management entity selects a user plane entity supporting the PDU session type indicated by the session management entity, as the local session anchor user plane entity.

Optionally, the first intermediate session management entity may further select a local session anchor user plane entity based on any two or three of the data transmission mode, the local DNN, or the PDU session type. For example, the first intermediate session management entity selects a local session anchor user plane entity based on the transmission mode and the local DNN. In this case, the first intermediate session management entity selects a user plane entity supporting the data transmission mode indicated by the session management entity and supporting the local DNN indicated by the session management entity, as the local session anchor user plane entity. A selection method based on other combinations can be deduced by analogy, and details are not described herein again. Optionally, if the local session anchor user plane entity selected based on the foregoing selection method can be connected to the serving base station indicated by the UE location information, this user plane entity may be selected as integration of a BP/ULCL and the local session anchor user plane entity.

S904. The first intermediate session management entity sends an N4 message to the selected BP or ULCL, and the BP/ULCL receives N3 uplink tunnel information and N9 downlink tunnel information from the first intermediate session management entity. This step is the same as S307, and details are not described herein again.

S905. The first intermediate session management entity sends the N4 message to the selected local anchor user plane entity. This step is the same as S308, and details are not described herein again.

S906. The first intermediate session management entity sends a response message to the session management entity, and the session management entity receives the response message from the first intermediate session management entity.

The response message may carry the N9 downlink tunnel information of the BP or the ULCL. In addition, when the data transmission mode is multihoming, the first intermediate session management entity may further send an IP address of local UE to the session management entity.

S907. The session management entity sends an N4 message to the anchor user plane entity, and the anchor user plane entity receives the N4 message from the session management entity. This step is the same as S310.

S908. Allocate a radio resource to the KW session. This step is the same as S311.

S909. The session management entity sends a PDU session update request to the first intermediate session management entity, and the first intermediate session management entity receives the PDU session update request from the session management entity. This step is the same as S312.

S910. The first intermediate session management entity sends the PDU session update request to the BP/UCLC, and the BP/ULCL receives the PDU session update request from the first intermediate session management entity. This step is the same as S313.

S911. The first intermediate session management entity sends a response message to the session management entity, and the session management entity receives the response message from the first intermediate session management entity. The response message indicates completion of updating the PDU session. This step is the same as S314.

S912. The first intermediate session management entity sends a route advertisement to the user equipment through the local anchor user plane entity.

Figure 10:
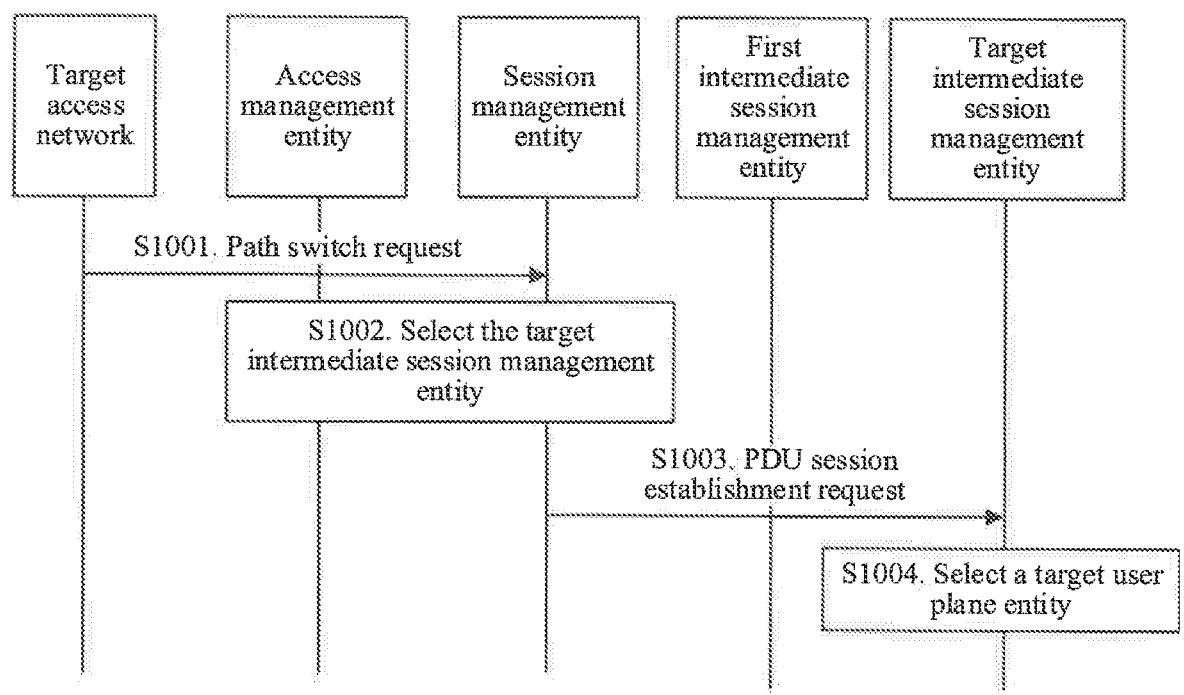
FIG. 10 is a schematic flowchart of another session management method according to an embodiment of the present invention.

The transmission mode in this step is a multihoming mode. The route advertisement carries the uplink routing policy and the IP address of the local UE that is allocated by the first intermediate session management entity. The uplink routing policy is used to control the UE to select a source address when the UE sends a data packet, where the source address is the IP address of the remote UE that is allocated by the session management entity or the IP address of the local UE that is allocated by the first intermediate session management entity. Optionally, the session management entity may also send a route advertisement to the user equipment as required, where the route advertisement is used to indicate a selection rule of the IP address of the remote UE or the IP address of the local UE to the UE, FIG. 10 is a schematic flowchart of a session management method according to an embodiment of the present invention. In this embodiment, a handover process in the architecture shown in FIG. 1a is described. Before a handover, a source access network of UE that is a serving base station (not shown), a source intermediate session management entity (a first intermediate session management entity), a source user plane entity, and an anchor user plane entity provide a service for a PDU session. When the handover occurs, the method includes but is not limited to the following steps.

S1001. A target access network sends a path switch request to a session management entity through an access management entity, and the session management entity receives the path switch request from the target access network. This step is the same as the description of S401, and details are not described herein again.

S1002. The session management entity selects a target intermediate session management entity.

The session management entity determines, based on UE location information, that the UE can access an application more conveniently (for example, access the application at a nearer location or at a higher speed) through a target local DN. The session management entity uses a target local DNN corresponding to the target local DN, as a local DNN in PDU session requirement information, and the session management entity selects the target intermediate session management entity. For a detailed selection process, refer to the description of S901 in FIG. 9, and details are not described herein again.

S1003. The session management entity sends a PDU session establishment request to the target intermediate session management entity, and the target intermediate session management entity receives the PDU session establishment request from the session management entity. This step is the same as S902, and details are not described herein again.

S1004. The target intermediate session management entity selects a target user plane entity. This step is the same as S903, and details are not described herein again.

It should be noted that the target intermediate session management entity sends an N4 message to the selected target user plane entity, and the target user plane entity receives the N4 message from the target intermediate session management entity. The target user plane entity creates an N9 tunnel to the anchor user plane entity, and creates an N3 tunnel to the target access network. The target intermediate session management entity sends a response message to the session management entity, where the response message carries identifier information of the created N3 tunnel and identifier information of the created N9 tunnel. The session management entity receives the identifier information of the N3 tunnel and the identifier information of the N9 tunnel that are sent from the intermediate session management entity, and updates the identifier information of the N9 tunnel of the anchor user plane entity. The session management entity sends a switch response message to the access management entity, and the access management entity receives the switch response message from the session management entity, and learns that the tunnel update process is completed.

Through implementation of this embodiment of the present invention, when a location of the UE is updated, the session management entity selects the intermediate session management entity and the user plane entity near the UE to provide a service for the UE, thereby reducing a delay during data transmission. In addition, the session management entity and the intermediate session management entity are responsible for managing only user plane entities within respective management areas, and do not need to manage all user plane entities in the entire PIDU session, thereby reducing a quantity of messages exchanged with the user plane entity and reducing workloads.

Figure 7:
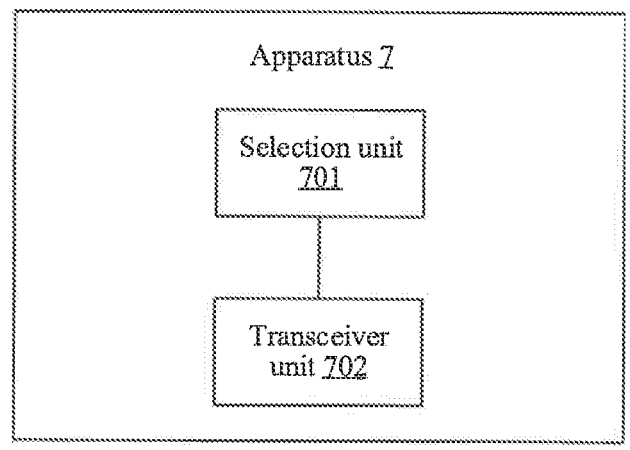
FIG. 7 is a schematic structural diagram of an apparatus according to an embodiment of the present invention.

It should be noted that, in a possible implementation, an apparatus 7 shown in FIG. 7 can implement the access management entity or the session management entity in the embodiments shown in FIG. 3 to FIG. 7. The apparatus 7 includes a selection unit 701 and a transceiver unit 702.

The selection unit 701 is configured to select a first intermediate session management entity for a protocol data unit PDU session based on user equipment UE location information and PDU session requirement information.

The transceiver unit 702 is configured to send the UE location information and the PDU session requirement information to the first intermediate session management entity, where the UE location information and the PDU session requirement information are used to select a user plane entity.

Optionally, the PDU session requirement information includes either or both of a session and service continuity SSC mode and a PDU session type.

Optionally, the selection unit 701 being configured to select a first intermediate session management entity for a protocol data unit PDU session based on UE location information and PDU session requirement information includes: selecting an intermediate session management entity as the first intermediate session management entity, where the intermediate session management entity meets the PDU session requirement information and manages an area covering a serving base station indicated by the UE location information.

Optionally, the apparatus 7 further includes a judging unit.

The judging unit is configured to: if a network device determines that an intermediate session management entity that meets the PDU session requirement information and that manages an area covering a serving base station indicated by the UE location information does not exist, the selection unit 701 is further configured to: select a second intermediate session management entity that meets the PDU session requirement information, and select a third intermediate session management entity that manages an area covering the serving base station indicated by the UE location information.

Optionally, the PDU session requirement information includes a data transmission mode and a local data network name DNN.

Optionally, the selection unit 701 being configured to select a first intermediate session management entity for a protocol data unit PDU session based on UE location information and PDU session requirement information includes: selecting an intermediate session management entity as the first intermediate session management entity, where the intermediate session management entity manages an area covering a serving base station indicated by the UE location information and a local data network DN indicated by the local DNN included in the PDU session requirement information and supports the data transmission mode in the PDU session requirement information.

Optionally, the apparatus 7 further includes a judging unit.

The judging unit is further configured to: if the network device determines that an intermediate session management entity that manages an area covering a serving base station indicated by the UE location information and a local DN indicated by the local DNN and supports the data transmission mode included in the PDU session requirement information does not exist, the selection unit 701 is further configured to: select a second intermediate session management entity that manages an area covering the serving base station indicated by the UE location information, and select a third intermediate session management entity that manages an area covering the local DN indicated by the local DNN included in the PDU session requirement information and that supports the data transmission mode included in the PDU session requirement information.

Optionally, the data transmission mode is a multihoming mode, and the transceiver unit 701 is further configured to:

send an uplink offloading policy and an uplink routing policy to the first intermediate session management entity, where the uplink offloading policy is used to control a branch point BP to which UE is anchored to perform offloading based on a source address of a data packet sent by the UE, and the uplink routing policy is used to control the UE to use an IP address anchored to an anchor user plane entity or a local IP address anchored to a local anchor user plane entity, as the source address of the data packet; or send, to the first intermediate session management entity, an IP address anchored to an anchor user plane entity and an uplink routing policy corresponding to the IP address anchored to the anchor user plane entity, where the IP address anchored to the anchor user plane entity is configured to enable the first intermediate session management entity to generate an uplink offloading policy, the uplink routing policy corresponding to the IP address anchored to the anchor user plane entity is configured to enable the first intermediate session management entity to generate an uplink routing policy, the uplink offloading policy is used to control a BP to perform offloading based on a source address of a data packet sent by UE, and the uplink routing policy is used to instruct the UE to use the IF address anchored to the anchor user plane entity or a local IF address anchored to a local anchor user plane entity, as a source address for sending data.

Optionally, the data transmission mode is an uplink classifier ULCL mode, and the transceiver unit 702 is further configured to:

send an uplink forwarding policy to the first intermediate session management entity, where the uplink forwarding policy is used to control an uplink classifier ULCL to which the UE is anchored to perform forwarding based on either or both of a quintuple and an application identifier of a data packet sent by the UE.

Optionally, the selection unit 701 is further configured to:

select a target session management entity when the UE is handed over to a target base station from a current serving base station, and when the target base station is not located within a management area of the first intermediate session management entity.

Optionally, the selection unit 701 being configured to select a target session management entity includes:

if it is determined that an intermediate session management entity that meets the PDU session requirement information and that manages an area covering the target base station to which the UE is handed over exists, selecting an intermediate session management entity as a target intermediate session management entity, where the intermediate session management entity manages an area covering the target base station to which the UE is handed over and meets the PDU session requirement information; or if it is determined that an intermediate session management entity that meets the PDU session requirement information and that manages an area covering the target base station to which the UE is handed over does not exist, selecting, by the network device, a second intermediate session management entity that meets the PDU session requirement information, and selecting a third intermediate session management entity that manages an area covering the target base station to which the UE is handed over, and using the second intermediate session management entity and the third intermediate session management entity as a target intermediate session management entity.

Optionally, the apparatus 7 is a session management entity, and the apparatus 7 further includes a determining unit.

The determining unit is configured to: determine the PDU session requirement information based on PDU session subscription information; or determine the PDU session requirement information based on PDU session subscription information and either or both of PDU session policy information and expected PDU session information.

The selection unit 701 is further configured to select an anchor user plane entity within the management area of the session management entity based on the PDU session requirement information.

The judging unit is further configured to determine, based on the UE location information, that the serving base station indicated by the UE location information is not connected to the anchor user plane entity.

Optionally, the apparatus 7 is a session management entity, and the session management apparatus 7 further includes a determining unit.

The determining unit is configured to determine the PDU session requirement information based on PDU session subscription information; or determine the PDU session requirement information based on PDU session subscription information and either or both of PDU session policy information and expected PDU session information, where the PDU session requirement information includes the local DNN.

The judging unit is further configured to determine that the local DN indicated by the local DNN included in the PDU session requirement information is not located within the management area of the session management entity.

Optionally, the apparatus 7 is an access management entity.

The selection unit 701 is further configured to select a session management entity. The judging unit is further configured to determine that the serving base station indicated by the UE location information is not located within the management area of the session management entity. The selection unit 701 is further configured to select a fourth intermediate session management entity. The transceiver unit 702 is further configured to receive the PDU session requirement information and a reselection indication message from the session management entity, where the reselection indication message is used to instruct the access management entity to select the first intermediate session management entity.

Optionally, the apparatus 7 is an access management entity.

The selection unit 701 is further configured to select a session management entity.

The judging unit is further configured to determine that the serving base station indicated by the UE location information is not located within the management area of the session management entity. The selection unit 701 is further configured to select a fourth intermediate session management entity. The transceiver unit 702 is further configured to receive the PDU session requirement information from the session management entity. The judging unit is further configured to determine that the fourth intermediate session management entity does not meet the PDU session requirement information.

Optionally, the apparatus 7 is an access management entity.

The transceiver unit 702 is further configured to receive new PDU session requirement information and a reselection indication message from the session management entity when a PDU session requirement changes, where the reselection indication message is used to instruct the session management apparatus 7 to select the first intermediate session management entity.

Optionally, the network device is an access management entity. The transceiver unit is further configured to receive new PDU session requirement information from the session management entity when a PDU session requirement changes.

The judging unit is further configured to determine that the first intermediate session management entity does not meet the new PDU session requirement information. The selection unit 701 is configured to select a target intermediate session management entity based on the UE location information and the new PDU session requirement information.

Optionally, the apparatus 7 is a session management entity, and the apparatus 7 further includes a determining unit. The determining unit is configured to: determine the PDU session requirement information based on PDU session subscription information; or determine the PDU session requirement information based on PDU session subscription information and either or both of PDU session policy information and expected PDU session information. The judging unit is further configured to determine that the fourth intermediate session management entity selected by the access management entity does not meet the PDU session requirement information. The transceiver unit 702 is further configured to send identifier information of the first intermediate session management entity to the access management entity.

It should be noted that, in another possible implementation, an apparatus 7 shown in FIG. 7 can implement the session management entity in the embodiments shown in FIG. 9 and FIG. 10. The apparatus 7 includes a selection unit 701 and a transceiver unit 702.

The selection unit 701 is configured to select a first intermediate session management entity for a protocol data unit PDU session based on a protocol local data network name DNN.

The transceiver unit 702 is configured to send user equipment UE location information to the first intermediate session management entity, where the UE location information is used to select a user plane entity.

Optionally, the selecting, by the selection unit 701, a first intermediate session management entity for a PDU session based on a local DNN includes:

selecting, based on the local DNN and the UE location information, the first intermediate session management entity that supports a local data network DN indicated by the local DNN and that manages an area covering a serving base station indicated by the UE location information.

Optionally, the selecting, by the selection unit 701, a first intermediate session management entity for a PDU session based on a local DNN includes:

selecting an intermediate session management entity as the first intermediate session management entity, where the intermediate session management entity supports a local DN indicated by the local DNN.

Optionally, the network device is a session management entity, and the selection unit 701 is further configured to:

determine the local DNN based on information from an application function.

Optionally, the transceiver unit 702 is further configured to:

send the UE location information to the first intermediate session management entity, where the UE location information is used to instruct the first intermediate session management entity to select a user plane entity that supports a UE location, and the user plane entity that supports the UE location is interfaced with an access network connected to UE.

Optionally, the transceiver unit 702 is further configured to:

send the local DNN to the first intermediate session management entity, where the local DNN is used to instruct the first intermediate session management entity to select a local anchor user plane entity.

Optionally, the user plane entity selected by the first intermediate session management entity supports both the local DNN and the UE location information; or when the user plane entity that supports both the local DNN and the UE location information does not exist, the first intermediate session management entity selects a user plane entity as the local anchor user plane entity based on the local DNN, where the user plane entity supports the local DNN; and selects, based on the UE location information, a user plane entity that supports the UE location information, where the user plane entity is configured to interface with the access network connected to the UE, and the local anchor user plane entity is configured to interface with the local DN.

Optionally, the transceiver unit 702 is further configured to:

send a data transmission mode to the first intermediate session management entity, where the data transmission mode is used to instruct the first intermediate session management entity to determine an uplink offloading rule.

Optionally, the transceiver unit 702 is further configured to:

send an IP address of remote UE to the first intermediate session management entity if the data transmission mode is multihoming multihoming, where the IP of the remote UE is used to instruct the first intermediate session management entity to determine the uplink offloading rule.

Optionally, the transceiver unit 702 is further configured to:

send application information to the first intermediate session management entity if the data transmission mode is an uplink classifier ULCL, and determine the uplink offloading rule based on the application information, where the application information is at least one of an application identifier or a quintuple corresponding to an application.

Optionally, the transceiver unit 702 is further configured to:

send the uplink offloading rule or an uplink forwarding rule to the first intermediate session management entity, where the uplink offloading rule or the uplink forwarding rule is used to instruct the first intermediate session management entity to configure the user plane entity to offload uplink data.

Optionally, the transceiver unit 702 is further configured to:

send information about routing between a local anchor and the local data network DN identified by the local DNN to the first intermediate session management entity, where the information about routing is used to determine a forwarding path between the user plane entity and the local DN.

The apparatus 7 may be an access management entity or a session management entity, and the apparatus 7 may also be a field programmable gate array (FPGA), an application-specific integrated circuit (ASIC), a system on chip (SoC), a central processing unit (CPU), a network processor (NP), a digital signal processing circuit (DSP), or a micro controller unit (MCU) that can implement a related function, or may be a programmable controller (PLD), or other integrated chips.

Figure 8:
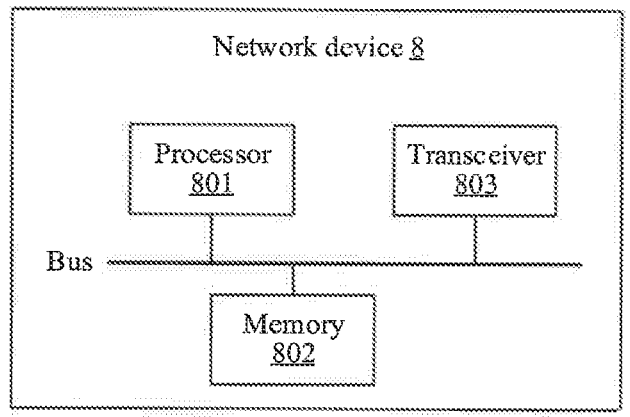
FIG. 8 is a schematic structural diagram of a network device according to an embodiment of the present invention.

As shown in FIG. 8, an embodiment of the present invention further provides a network device 8.

The network device may be an access management entity or a session management entity, and includes:

a memory 803, configured to store a program and data, where the memory may be a random access memory (RAM for short) or a read-only memory (ROM for short) or a flash memory; and the memory 803 may be separately located within a communications device or located inside the processor 801;

a processor 801, configured to execute the program stored in the memory, where when the program is executed, the processor 801 is configured to select a first intermediate session management entity for a protocol data unit PDU session based on user equipment UE location information and PDU session requirement information; and a transceiver 802, which may be used as a separate chip, or may be a transceiver circuit inside the processor 801 or be used as an input/output interface, where the transceiver 802 is configured to send the UE location information and the PDU session requirement information to the first intermediate session management entity, where the UE location information and the PDU session requirement information are used to select a user plane entity.

It should be noted that the network device in this embodiment, the session management apparatus in FIG. 7, and the method processes in FIG. 3 to FIG. 6 and FIG. 9 and FIG. 10 are based on a same concept, and bring same technical effects. For a detailed process, refer to the descriptions of the session management apparatus in FIG. 7 and the method processes in FIG. 3 to FIG. 6 and FIG. 9 and FIG. 10. Details are not described herein again.

Optionally, the transceiver 802, the memory 803, and the processor 801 are connected through a bus.

When the network device 8 is a chip, the network device 8 may be a field programmable gate array (FPGA), an application-specific integrated circuit (ASIC), a system on chip (SoC), a central processing unit (CPU), a network processor (NP), a digital signal processing circuit (DSP), or a micro controller unit (MCU) that can implement a related function, or may be a programmable controller (PLD), or other integrated chips.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located within one position, or may be distributed on a plurality of network units. Some or all of the units may be selected based on actual requirements to achieve the objectives of the solutions of the embodiments.

In addition, functional units in the embodiments of his application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instruction may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (SSD)), or the like.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A session management method comprising:
   receiving, by an access management entity, a request to establish a protocol data unit (PDU) session of user equipment (UE);
   receiving, by the access management entity, a message from a session management entity, wherein the message includes a local data network name (DNN);
   selecting, by the access management entity, a first intermediate session management entity for serving the PDU session based on UE location information and the local DNN, wherein the local DNN indicates a local data network (DN) for the UE to communicate with via a user plane entity in an area managed by the first intermediate session management entity, and wherein the first intermediate session management entity is connected to the session management entity and the user plane entity; and
   sending, by the access management entity, the UE location information and the local DNN to the first intermediate session management entity, wherein the UE location information and the local DNN are for selecting the user plane entity for the PDU session.

2. The session management method according to claim 1, wherein the user plane entity comprises a local anchor user plane entity connected to the local DN.

3. An access management entity, comprising:
   a memory storing executable instructions;
   a processor; and
   a transceiver;
   wherein the processor is configured to execute the executable instructions to:
   receiving, using the transceiver, a request to establish a protocol data unit (PDU) session of user equipment (UE);
   receive, using the transceiver, a message from a session management entity, wherein the message includes a local data network name (DNN);
   select a first intermediate session management entity for serving the PDU session based on UE location information and the local DNN, wherein the local DNN indicates a local data network (DN) for the UE to communicate with via a user plane entity in an area managed by the first intermediate session management entity, and wherein the first intermediate session management entity is connected to the session management entity and the user plane entity; and
   send, using the transceiver, the UE location information and the local DNN to the first intermediate session management entity, wherein the UE location information and the local DNN are for selecting the user plane entity for the PDU session.

4. The access management entity according to claim 3, wherein the user plane entity comprises a local anchor user plane entity connected to the local DN.

5. A system, comprising:
   a session management entity;
   an access management entity comprising a processor, a memory, and a transceiver; and
   a plurality of intermediate session management entities,
   wherein the access management entity is configured to:
   receive a request to establish a protocol data unit (PDU) session of user equipment (UE);
   receive a message from the session management entity, wherein the message includes a local data network name (DNN);
   select a first intermediate session management entity from the plurality of intermediate session management entities for the PDU session based on UE location information and the local DNN, wherein the local DNN indicates a local data network (DN) for the UE to communicate with via a user plane entity in an area managed by the first intermediate session management entity, and wherein the first intermediate session management entity is connected to the session management entity and the user plane entity; and
   send the UE location information and the local DNN to the first intermediate session management entity, wherein the UE location information and the local DNN are for selecting the user plane entity for the PDU session; and
   wherein the first intermediate session management entity is configured to:
   receive, from the access management entity, the UE location information and the local DNN; and
   select the user plane entity for serving the PDU session of the UE.

6. The system according to claim 5, wherein the user plane entity comprises a local anchor user plane entity connected to the local DN.

7. A session management method, comprising:
   receiving, by an access management entity, a request to establish a protocol data unit (PDU) session of user equipment (UE),
   receiving, by the access management entity, a message from a session management entity, wherein the message includes a local data network name (DNN);

selecting, by the access management entity, a first intermediate session management entity for serving the PDU session based on UE location information and the local DNN, wherein the local DNN indicates a local data network (DN) for the UE to communicate with via a user plane entity in an area managed by the first intermediate session management entity, and wherein the first intermediate session entity is connected to the session management entity and the user plane entity;

sending, by the access management entity, the UE location information and the local DNN to the first intermediate session management entity, wherein the UE location information and the local DNN are for selecting the user plane entity for the PDU session;

receiving, by the first intermediate session management entity, the UE location information and the local DNN; and selecting, by the first intermediate session management entity, the user plane entity for serving the PDU session of the UE.

8. The session management method according to claim 7, wherein the user plane entity comprises a local anchor user plane entity connected to the local DN.

\* \* \* \* \*